US 6,750,591 B2

(12) United States Patent
Akiba et al.

(10) Patent No.: US 6,750,591 B2
(45) Date of Patent: *Jun. 15, 2004

(54) METHOD OF DRIVING AN ELECTROSTATIC ACTUATOR

(75) Inventors: Toshikatsu Akiba, Kisarazu (JP); Akihiro Koga, Kawasaki (JP); Takashi Haraguchi, Fujisawa (JP); Akihiro Kasahara, Sambu-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/445,126

(22) Filed: May 27, 2003

(65) Prior Publication Data

US 2003/0218404 A1 Nov. 27, 2003

Related U.S. Application Data

(62) Division of application No. 09/963,424, filed on Sep. 27, 2001, now Pat. No. 6,680,558.

(30) Foreign Application Priority Data

Sep. 28, 2000 (JP) .......................................... 2000-297432

(51) Int. Cl.[7] ............................................... H02N 1/00
(52) U.S. Cl. .................................................... 310/309
(58) Field of Search ................... 310/12, 309; 318/116; 396/75, 661, 439; 348/374

(56) References Cited

U.S. PATENT DOCUMENTS

| 5,001,381 | A | 3/1991 | Watanabe |
| 5,235,225 | A | 8/1993 | Colgate et al. |
| 5,523,639 | A | 6/1996 | Okamoto et al. |
| 6,134,057 | A | 10/2000 | Ueyama et al. |
| 2001/0028203 | A1 | 10/2001 | Kasahara et al. |
| 2002/0037171 | A1 | 3/2002 | Kasahara |
| 2002/0050764 | A1 | 5/2002 | Koga et al. |
| 2002/0074896 | A1 | 6/2002 | Kasahara |
| 2002/0106204 | A1 | 8/2002 | Miyaharrura |

FOREIGN PATENT DOCUMENTS

| JP | 03-169278 | 7/1991 |
| JP | 08-033361 | 2/1996 |
| JP | 09-163761 | 6/1997 |
| JP | 10-239578 | 9/1998 |
| JP | 10-239740 | 9/1998 |
| JP | 11-004803 | 1/1999 |
| JP | 11-281870 | 10/1999 |

OTHER PUBLICATIONS

A. Koga, et al., Journal of Lightwave Technology, vol. 17, No. 1, pp. 43–47. "Electrostatic Linear Microactuator Mechanism for Forcusing a CCD Camera," Jan. 1999.
"Attachment/Detachment Electrostatic Micro Actuators for Pan–tilt Drive for a Micro CCD Camera." Koga et al., Jan. 1996.
"Electrostatic Linear Micro Actuators with Vibration Motion for Pan–Tilt Drive of a Mcro CCD Camera." Koga et al., Jan. 1996.

*Primary Examiner*—Karl Tamai
(74) *Attorney, Agent, or Firm*—Oblon, Spivak, McClelland, Maier & Neustadt, P.C.

(57) ABSTRACT

An electrostatic actuator comprises first and second movable sections and a stator. The stator has a hollow frame into which the movable sections are arranged independently. Driving electrodes are provided on surfaces of the movable sections and holding electrodes are also provided on the opposite surfaces pf the movable section. A driving electrode section is provided on the inner surface of the stator facing the driving electrodes on the movable section. Also, holding electrode sections are provided on the inner surface of the stator facing the holding electrodes on the movable section. Stripes of the electrodes are arranged in a longitudinal direction and each strip is extended in a lateral direction crossing the longitudinal direction, and the holding electrodes are extended in the longitudinal direction.

25 Claims, 14 Drawing Sheets

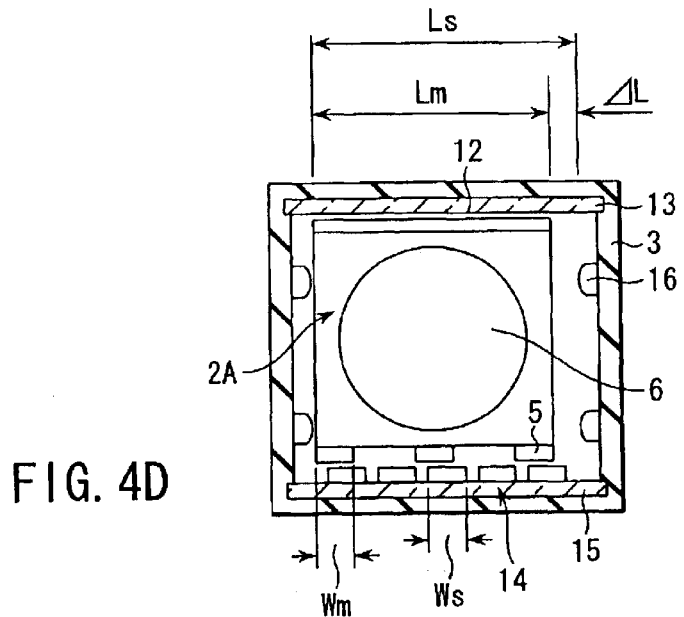
FIG. 4D
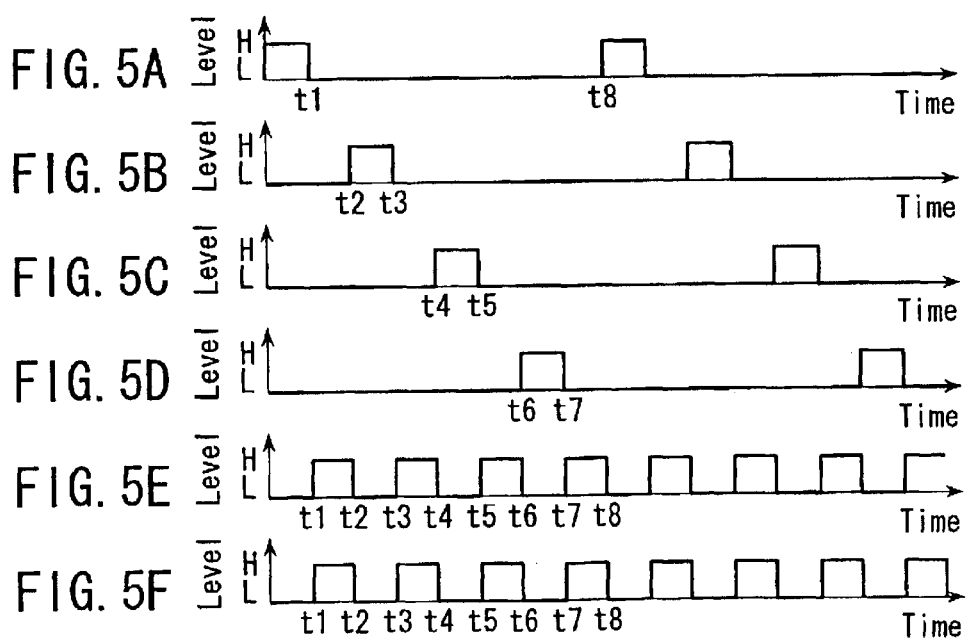
FIG. 5A
FIG. 5B
FIG. 5C
FIG. 5D
FIG. 5E
FIG. 5F

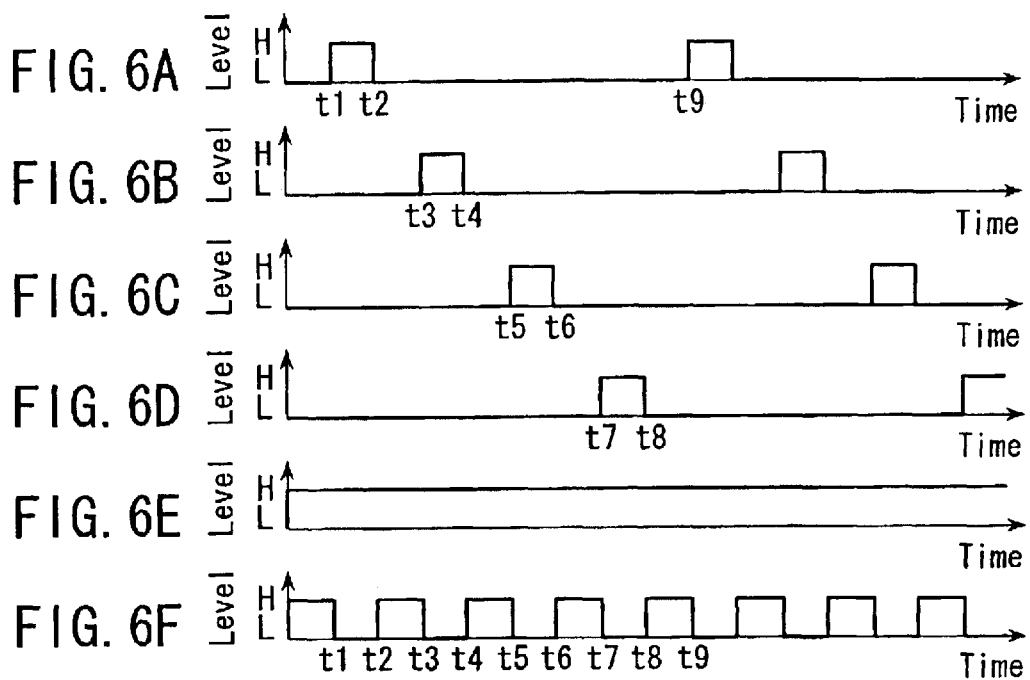
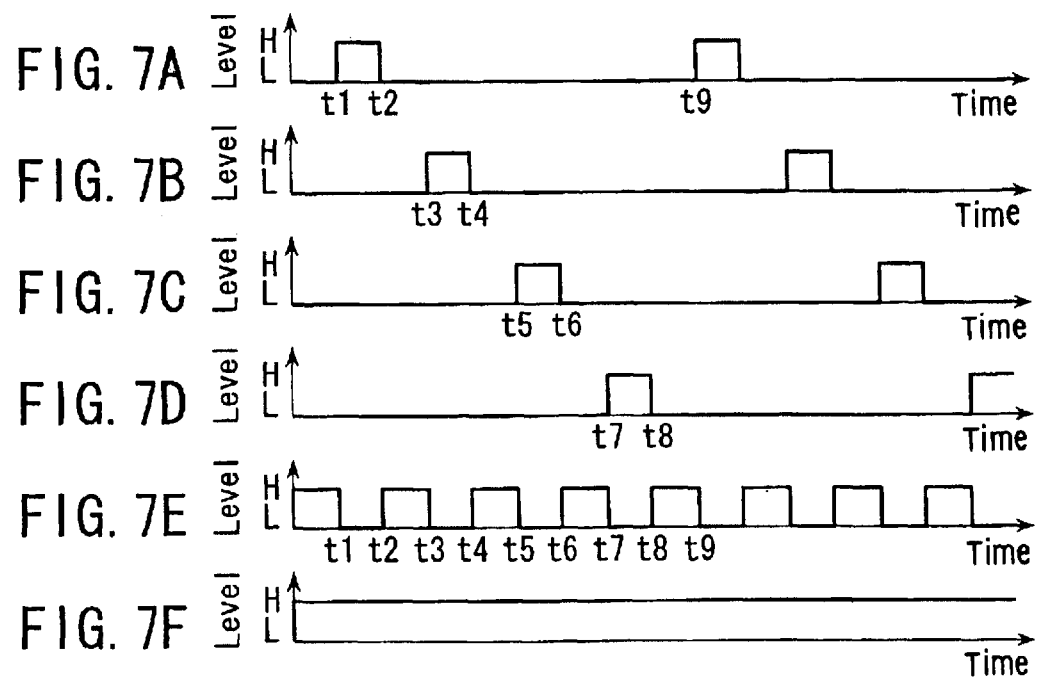

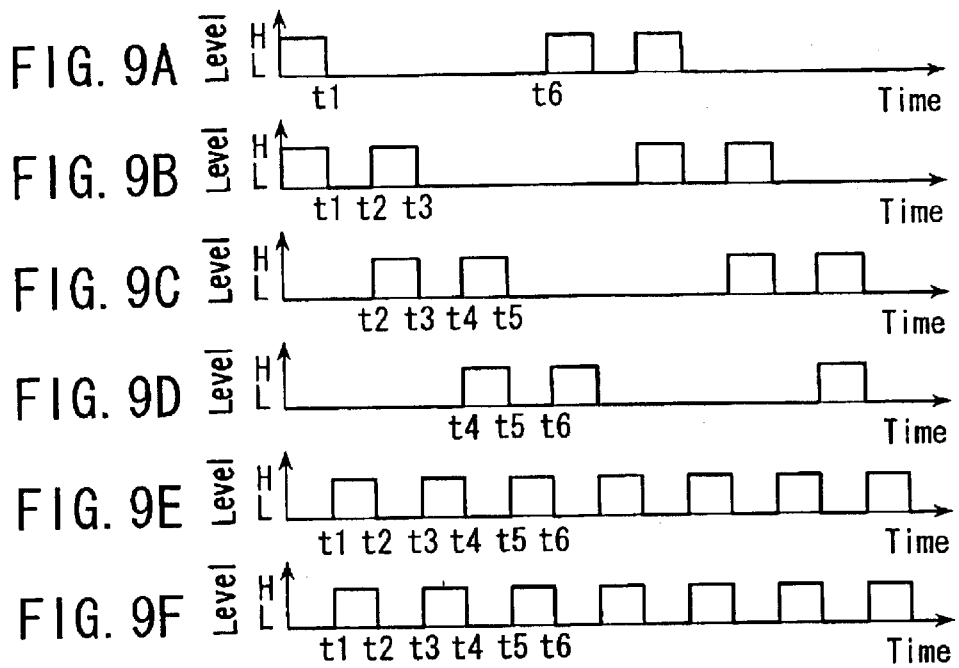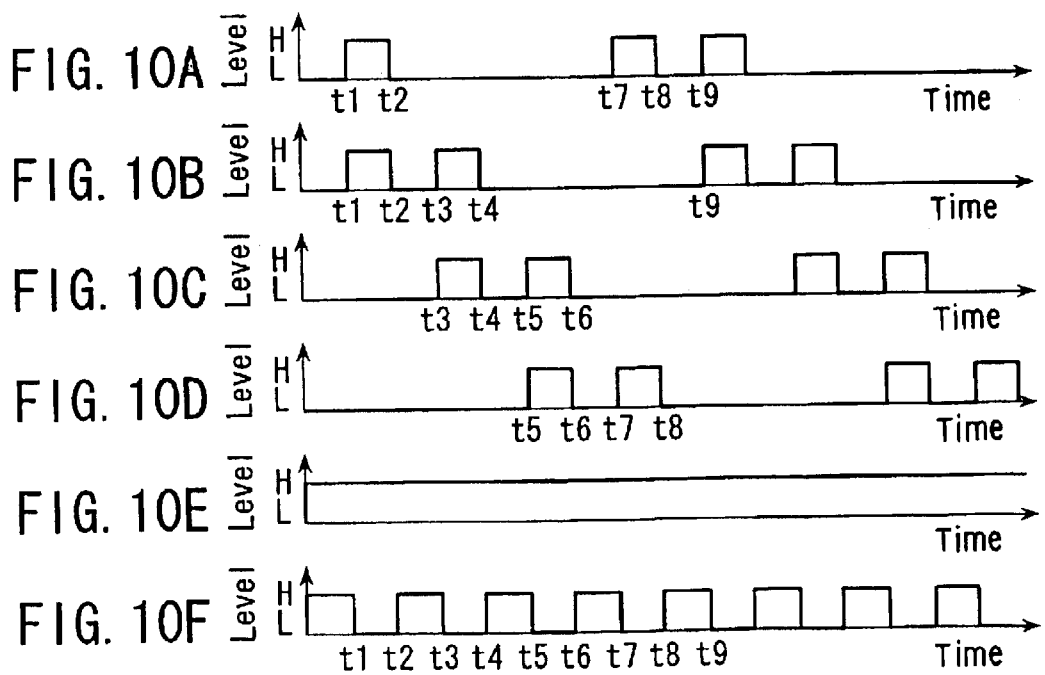

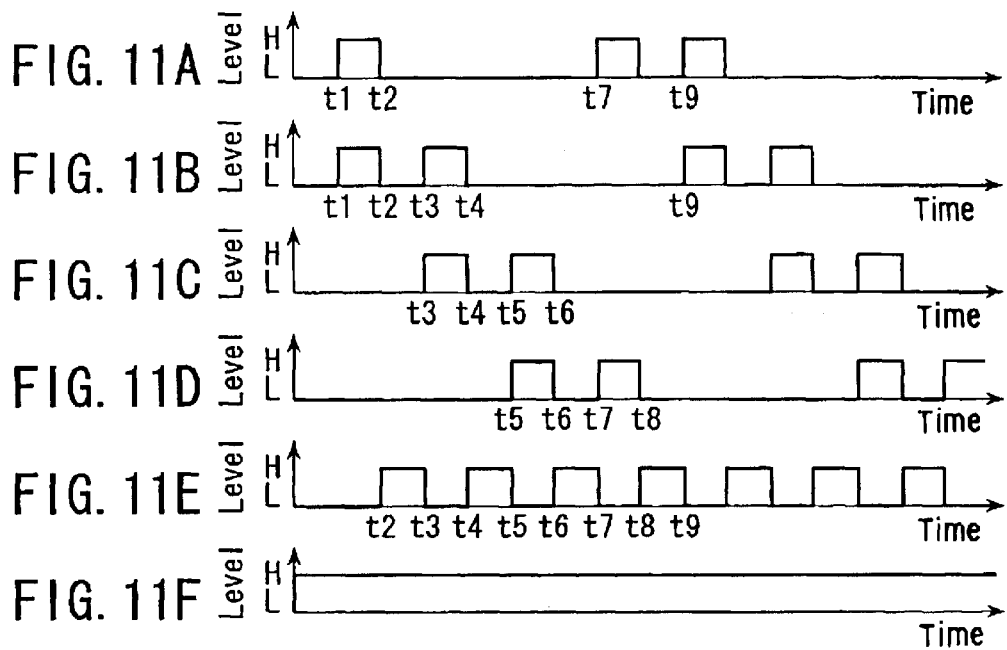
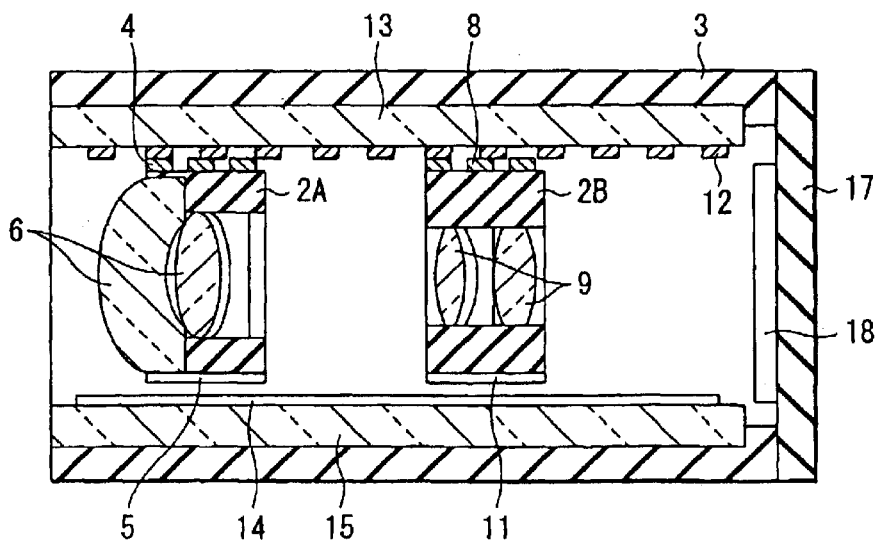
FIG. 12A

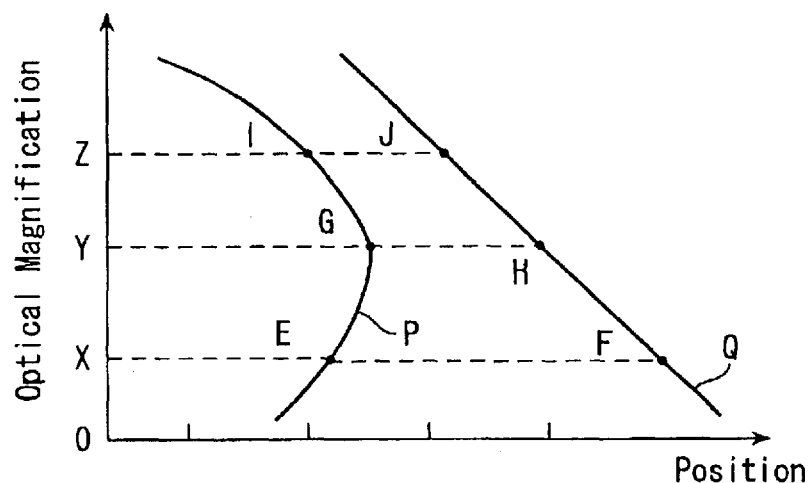
FIG. 12B
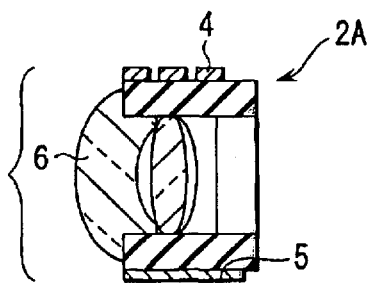 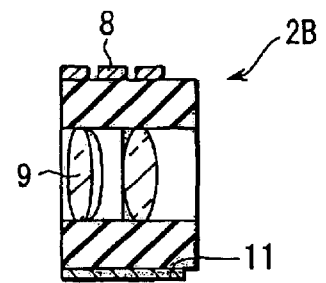
FIG. 13A
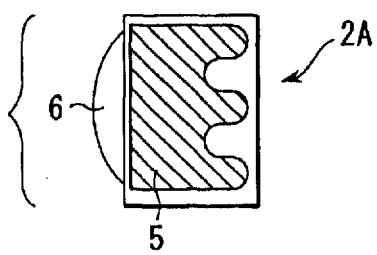 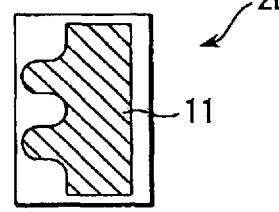
FIG. 13B
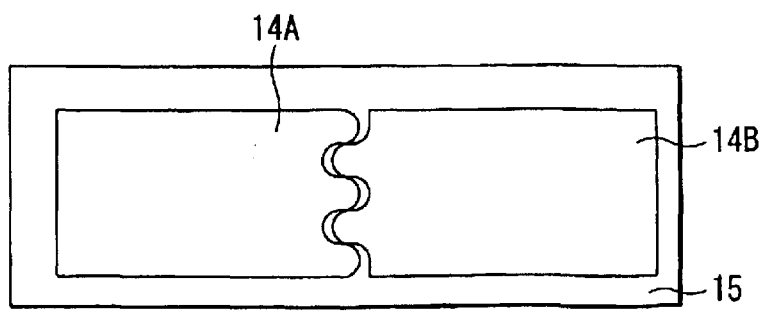
FIG. 13C

METHOD OF DRIVING AN ELECTROSTATIC ACTUATOR

CROSS-REFERENCE TO RELATED APPLICATIONS

This application is based upon and claims the benefit of priority from the prior Japanese Patent Application No. 2000-297432, filed Sep. 28, 2000, the entire contents of which are incorporated herein by reference.

BACKGROUND OF THE INVENTION

1. Field of the Invention

The present invention relates to an electrostatic actuator for electrostatically driving a slider or a movable section and a method of driving the same, particularly, to an electrostatic actuator including movable sections that can be driven individually and a method of driving the same.

2. Description of the Related Art

An electrostatic actuator is small and lightweight and, thus, can be used for the focusing of a lens system mounted to an endoscope, a movable telephone such as a portable telephone or an apparatus such as various kinds of PDA (Personal Digital Assistant). Such being the situation, the electrostatic actuator attracts attentions in recent years.

FIG. 1 is an oblique view showing the construction of a conventional electrostatic actuator 100. As shown in the drawing, the electrostatic actuator 100 comprises a slider or movable section 101 and a stator 102. The movable section 101 is substantially in the form of a parallelepiped having a through-hole formed therein in a manner to extend in the longitudinal direction of the movable section 101, and the stator 102 is also substantially in the form of a parallelepiped having a through-hole formed therein in a manner to extend in the longitudinal direction of the stator 102. The movable section 101 is slidable into the through-hole of the stator 102 such that the movable section 101 is movable within the stator 102 in the longitudinal direction of the stator 102. Incidentally, a clearance of several microns is provided between the stator 102 and the movable section 101.

Also, a convex stripe electrodes 103A and 103B are formed by, for example, an etching in the movable section 101 so as to form a pair of electrode surfaces facing the inner surfaces of the stator 102. An optical system of lenses 104 having optical axes extending along the axis of the through-hole are fixed within the through-hole of the movable section 101. The movable section 101 is moved and the optical system of these lenses is also moved with the movable section 101 so as to adjust the focus of the optical system on a subject to be examined.

A wiring 105 for applying a driving signal to the movable section 101 is connected to the movable section 101. Glass plates 106A and 106B are mounted to those inner surfaces of the stator 102 which face the electrodes 103A and 103B, respectively, and first electrodes 107A of a first group GA and a second group GB and second electrodes 107B of a third group GC and a fourth group GD are formed on the glass plates 106A and 106B, respectively, by patterning a conductive material. The electrodes 107A of the first group GA and the second group GB are alternately arranged at the same pitch. Likewise, the electrodes 107B of the third group GC and the fourth group GD are also alternately arranged in the same pitch. Also, the electrodes 107A and the electrodes 107B are arranged deviant from each other by a half pitch.

The operation of the electrostatic actuator having the construction described above will now be described with reference to FIG. 2.

(1) In the first step, a voltage of +V [V] is applied to the first group GA of the electrode 107A. As a result, an electrostatic attracting force is generated between the electrode 107A of the first group GA and the electrode 103A. By this electrostatic attracting force, the movable section 101 begins to be moved toward the glass plate 106A of the stator 102, and the electrode 103A is attracted to the electrode 107A of the first group GA a predetermined time later.

(2) In the next step, a voltage of +V [V] is applied to the electrode 107B of the third group GC among the electrodes 107B, with the result that an electrostatic force is generated between the electrode 107B of the third group GC and the electrode 103B. By this electrostatic force, the movable section 101 begins to be moved toward the glass plate 106B of the stator 102. As a result, the electrode 103B is attracted to the electrode 107B of the third group GC a predetermined time later. The movable section 101 is moved to the right in FIG. 2 by a distance equal to half the arranging pitch of the electrode 106A or 106B, compared with the position described in item (1) above.

(3) Further, a voltage of +V [V] is applied to the second group GB of the electrode 107A, with the result that an electrostatic force is generated between the electrode 107A of the second group GB and the electrode 103A. By this electrostatic force, the movable section 101 begins to be moved again toward the glass plate 106A, and the electrode 103A is attracted to the electrode 107A of the second group GB a predetermined time later. The movable section 101 is moved to the right in FIG. 2 by a distance equal to the arranging pitch of the electrode 107A or 107B, compared with the position described in item (1) above.

(4) Still further, a voltage of +V [V] is applied to the fourth electrode GD of the electrode 107B, with the result that an electrostatic force is generated between the electrode 107B of the fourth group GD and the electrode 103B. By this electrostatic force, the movable section 101 begins to be moved again toward the glass substrate 106B, and the electrode 103B is attracted to the electrode 107B of the fourth group GD. The movable section 101 is moved to the left in FIG. 2 by a distance equal to 1.5 times as much as the arranging pitch of the electrode 107A or 107B, compared with the position described in item (1) above.

The steps of items (1) to (4) described above are repeated so as to move the movable section 101 to the right in FIG. 2 by a distance equal to half the arranging pitch of the electrodes every time each of the steps of items (2) to (4) is performed.

It should also be noted that, if the voltage is applied to the electrode in the order of items (4), (3), (2) and (1) described above, the movable section 101 can be moved to the right in FIG. 2 by a distance equal to half the arranging pitch of the electrodes every time each of the steps of items (3) to (1) is performed.

It is possible to move the lens 104 mounted to the movable section 101 by moving the movable section 101 by the steps of items (1) to (4) described above so as to adjust the focus of the lens 104 on the subject.

As described above, in the conventional electrostatic actuator, it is possible to move the movable section to a desired position so as to adjust the focus of the lens on the subject to be photographed. However, the conventional electrostatic actuator gives rise to the problem that it is impossible to realize the zooming function of magnifying or reducing the photographed image. The difficulty is based on the mechanism that the lens system is moved with a single movable section.

It should also be noted that, even if a plurality of movable sections are mounted to the conventional electrostatic actuator for magnifying or reducing the photographed image, it is necessary for the plural movable sections to be moved or fixed independently for magnifying or reducing the photographed image. In the electrostatic actuator of the conventional structure, however, it is impossible to operate the electrostatic actuator with the plural movable sections moved or fixed within the stator independently.

BRIEF SUMMARY OF THE INVENTION

An object of the present invention is to provide an electrostatic actuator capable of independently operating movable sections for magnifying or reducing the photographed image.

According to a first aspect of the present invention, there is provided an electrostatic actuator, comprising:

- first stator electrodes arranged in a predetermined direction and extending in a direction crossing the predetermined direction;
- a second stator electrode arranged to face the first stator electrodes and extending in the predetermined direction;
- a third stator electrode arranged to face the first stator electrodes and extending in the predetermined direction so as to be electrically isolated from the second stator electrode;
- a first movable section provided with first and second movable section electrodes, arranged movable within a moving space in the predetermined direction, the moving space being defined between the first stator electrodes and the second stator electrode, the first movable section electrodes being mounted to the first movable section to face the first stator electrodes, and the second movable section electrode being mounted to the first movable section to face the second stator electrode; and
- a second movable section provided with third and fourth movable section electrodes, arranged independently of the first movable section, the second movable section being movable within the moving space in the predetermined direction, the third movable section electrodes being mounted to the second movable section to face the first stator electrodes, and the fourth movable section electrode being mounted to the second movable section to face the third stator electrode.

According to a second aspect of the present invention, there is provided an electrostatic actuator comprising:

- a stator including a hollow stator frame having a space extending in a predetermined direction, the stator frame having a first inner surface extending in parallel to the predetermined direction and a second inner surface facing the first inner surface, first stator electrodes arranged in the predetermined direction on the first inner surface and each of the stator electrode extending in a direction crossing the predetermined direction, and second and third stator electrodes electrically isolated each other, arranged on the second inner surface and extending in the predetermined direction;
- a first movable section arranged in the space to be movable in the predetermined direction, the first movable section including first movable section electrodes facing the first stator electrodes, each of the first movable section electrodes extending in a direction crossing the predetermined direction, and a second movable section electrode extending in the predetermined direction to face the second stator electrode;
- a second movable section arranged in the space to be movable in the predetermined direction, and including third movable section electrodes facing the first electrodes, each of the third movable section electrodes extending in a direction crossing the predetermined direction, and a fourth movable section electrode extending in the predetermined direction to face the third stator electrode, and
- a driving circuit configured to supply a first driving signal to the first stator electrodes, to supply one of a second driving signal and a first holding voltage signal to the second stator electrode, and to supply one of a third driving signal and a second holding voltage signal to the third stator electrode so as to move both or one of the first and second movable sections in the predetermined direction.

According to a third aspect of the present invention, there is provided an imaging apparatus for forming an image of a subject on an image-forming surface, comprising:

- first stator electrodes arranged in a predetermined direction and extending in a direction crossing the predetermined direction;
- a second stator electrode arranged to face the first stator electrodes and extending in the predetermined direction;
- a third stator electrode arranged to face the first stator electrodes and extending in the predetermined direction so as to be electrically isolated from the second stator electrode;
- a first movable section having a first hollow space, provided with first and second movable section electrodes, arranged movable within a moving space in the predetermined direction, the moving space being defined between the first stator electrodes and the second stator electrode, the first movable section electrodes being mounted to the first movable section to face the first stator electrodes, and the second movable section electrode being mounted to the first movable section to face the second stator electrode; and
- a second movable section having a second hollow space, provided with third and fourth movable section electrodes, arranged independently of the first movable section, the second movable section being movable within the moving space in the predetermined direction, the third movable section electrodes being mounted to the second movable section to face the first stator electrodes, and the fourth movable section electrode being mounted to the second movable section to face the third stator electrode.
- a first optical lens system having a first optical axis arranged in the predetermined direction within the first hollow space;
- a second optical system having a second optical axis arranged in the predetermined direction within the second hollow space, the image forming surface configured to face an image of a subject depending on the positions of the first and second lens systems relative to the image-forming surface; and
- a driving circuit configured to supply a first driving signal to the first stator electrodes, to supply one of a second driving signal and a first holding voltage signal to the second stator electrode, and to supply one of a third driving signal and a second holding voltage signal to the third stator electrode so as to move both or one of the first and second movable sections in the predetermined direction.

According to a fourth aspect of the present invention, there is provided a method of driving an electrostatic actuator, the electrostatic actuator comprising:

first stator electrodes arranged in a predetermined direction and extending in a direction crossing the predetermined direction;

a second stator electrode arranged to face the first stator electrodes and extending in the predetermined direction;

a third stator electrode arranged to face the first stator electrodes and extending in the predetermined direction so as to be electrically isolated from the second stator electrode;

a first movable section provided with first and second movable section electrodes, arranged movable within a moving space in the predetermined direction, the moving space being defined between the first stator electrodes and the second stator electrode, the first movable section electrodes being mounted to the first movable section to face the first stator electrodes, and the second movable section electrode being mounted to the first movable section to face the second stator electrode; and a second movable section provided with third and fourth movable section electrodes, arranged independently of the first movable section, the second movable section being movable within the moving space in the predetermined direction, the third movable section electrodes being mounted to the second movable section to face the first stator electrodes, and the fourth movable section electrode being mounted to the second movable section to face the third stator electrode; the method comprising:

supplying a first driving a driving signal to the first stator electrodes;

supplying one of a second driving voltage and a first holding voltage signal to the second stator electrode; and supplying one of a third driving signal and a second holding voltage signal to the third stator electrode wherein both or one of the first and second movable sections move in the predetermined direction.

BRIEF DESCRIPTION OF THE SEVERAL VIEWS OF THE DRAWING

FIG. 4D is a cross sectional view schematically showing the relationship between the number of holding electrodes and the side surface gap in the electrostatic actuator shown in FIG. 4A;

FIGS. 5A to 5F are timing charts showing the voltages applied to the electrodes of the stator in the case where two movable sections are simultaneously moved in the same direction in the electrostatic actuator shown in FIG. 4A;

FIGS. 6A to 6F are timing charts showing the voltages applied to the electrodes of the stator in the case where one of two movable sections is moved in a certain direction in the electrostatic actuator shown in FIG. 4A;

FIGS. 7A to 7F are timing charts showing the voltages applied to the electrodes of the stator in the case where the other of the two movable sections is moved in a certain direction in the electrostatic actuator shown in FIG. 4A;

FIGS. 9A to 9F are timing charts showing the voltages applied to the electrodes of the stator in the case where two movable sections are simultaneously moved in the same direction in the electrostatic actuator shown in FIG. 8A;

FIGS. 10A to 10F are timing charts showing the voltages applied to the electrodes of the stator in the case where one of two movable sections is moved in a certain direction in the electrostatic actuator shown in FIG. 8B;

FIGS. 11A to 11F are timing charts showing the voltages applied to the electrodes of the stator in the case where the other of the two movable sections is moved in a certain direction in the electrostatic actuator shown in FIG. 8C;

FIG. 12A is a vertical cross sectional view schematically showing the inner structure of an electrostatic actuator according to a modification of the first embodiment of the present invention;

FIG. 12B is a graph showing the relationship between the positions of the first and second movable sections and the optical magnification in the electrostatic actuator shown in FIG. 12A;

FIG. 13A is a vertical cross sectional view schematically showing the movable section of an electrostatic actuator according to a modification of a second embodiment of the present invention;

FIG. 13B is a plan view schematically showing the electrode pattern on the lower surface of the movable section shown in FIG. 13A;

FIG. 13C is a plan view schematically showing the electrode pattern on the glass plate of a stator of the electrostatic actuator having the movable sections shown in FIGS. 13A and 13B incorporated therein;

DETAILED DESCRIPTION OF THE INVENTION

Electrostatic actuators according to some embodiments of the present invention will now be described with reference to the accompanying drawings.

The electrostatic actuator, which is small and lightweight, can be used for the focusing of the lens mounted to an endoscope, a movable telephone such as a portable telephone and various PDA's (Personal Digital Assistants) and, thus, attracts attentions in recent years.

FIGS. 3A to 4A collectively show an electrostatic actuator according to a first embodiment of the present invention.

Figure 3A:
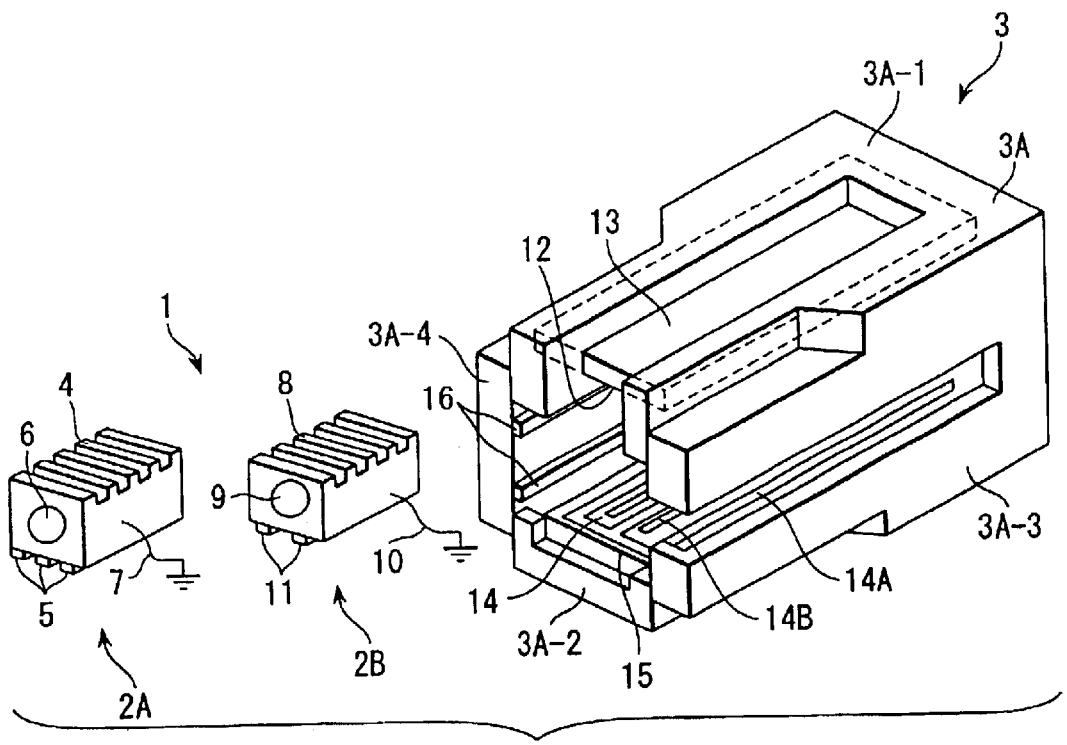
FIG. 3A is an oblique view schematically showing the construction of an electrostatic actuator according to a first embodiment of the present invention, in which pair of movable sections is located outside of the stator frame.
Figure 3B:
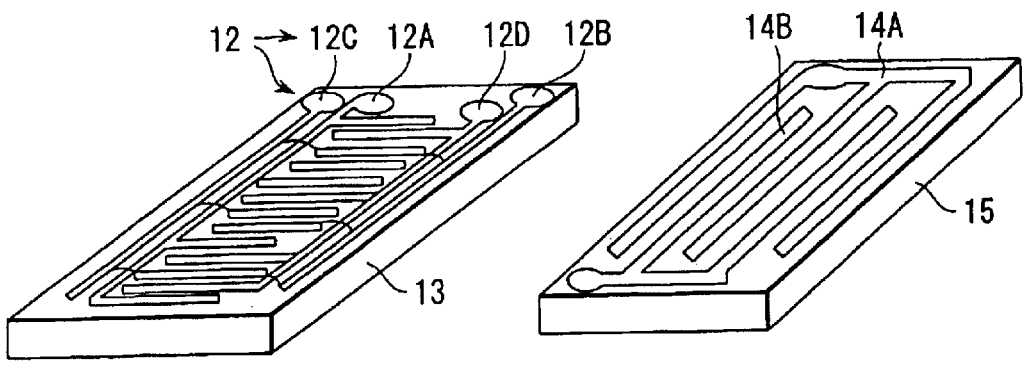
FIG. 3B is an oblique view schematically showing the arrangement of the stator electrodes of the stator on the driving side shown in FIG. 3A.
Figure 3C:
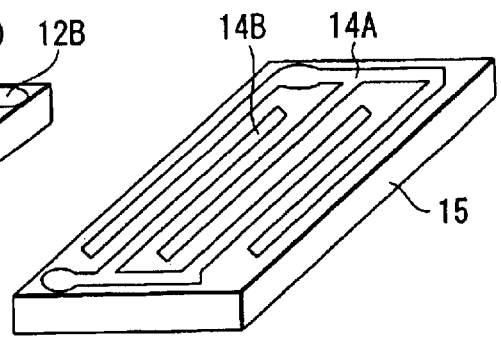
FIG. 3C is an oblique view schematically showing the arrangement of the stator electrodes on the side of holding the movable section shown in FIG. 3A.

FIG. 3A is an oblique view schematically showing the electrostatic actuator 1 according to the first embodiment of the present invention. The electrostatic actuator 1 shown in FIG. 3A comprises first and second movable sections 2A and 2B having a pair of movable section electrodes 4, 8 and another pair of movable section electrodes 5, 11 formed on the upper surfaces and the lower surfaces, respectively, and a stator 3 having a pair of stator electrode sections 12, 14 arranged to face the movable section electrodes 4, 8 on the upper surfaces and the movable section electrodes 5, 11 on the lower surfaces of the movable sections 2A, 2B, respectively.

The movable section electrodes 4, 8, 5, 11 are grouped into driving electrodes 4, 8 for driving the movable sections 2A, 2B and the holding electrodes 5, 11 for fixing the movable sections 2A, 2B. On the other hand, the stator electrode sections 12, 14 are grouped into a driving electrode 12 for driving the stator and a holding electrode 14 for holding the movable sections 2A, 2B at the desired positions.

The construction of the stator 3 will now be described. Specifically, the stator 3 is formed of a stator frame 3A formed of a frame of a hollow cube having a through-hole formed therein. The stator frame 3A has an upper inner surface 3A-1, a lower inner surface 3A-2, and side inner surfaces 3A-3 and 3A-4.

A driving electrode section 12 for driving the movable sections 2A, 2B is formed on one inner surface of the stator frame 3A, e.g., on the upper inner surface 3A-1. Further, a holding electrode section 14 for holding the movable sections 2A, 2B at the desired positions is formed on another inner surface facing the upper inner surface of the stator frame 3A, e.g., on the lower inner surface 3A-2.

The driving electrode section 12 is patterned in a desired shape and formed on the surface of a glass plate 13 in a manner to form a plurality of electrode stripes extending in, for example, the direction perpendicular to the longitudinal direction of the stator 3, i.e., extending in the lateral direction of the stator 3, as shown in FIG. 3A. Incidentally, the glass plate 13 having the driving electrode section 12 formed thereon is fitted to the inner surface 3A-1 of the stator 3. Also, each of the electrode stripes 12A to 12D of the driving electrode section 12 has a width of about 20 $\mu$m. Also, the clearance between the adjacent electrode stripes of the electrode stripes 12A to 12D of the driving electrode section 12 is about 20 $\mu$m, and the electrode stripes 12A to 12D are arranged at a pitch of about 40 $\mu$m.

A holding electrode section 14 is formed on the inner surface 3A-2 of the stator frame 3A facing the driving electrode section 12. The holding electrode section 14 is patterned in a desired shape and formed in a predetermined direction on the surface of a glass plate 15. The glass plate 15 having the holding electrode formed thereon is fitted to the inner surface 3A-2 of the stator 3. It should be noted that 5 electrode stripes are formed in parallel in the holding electrode section 14 in a manner to correspond to 3 holding electrodes 5 on the side of the movable section of a first movable section 2A referred to herein later and 2 holding electrodes 11 on the side of the movable section of a second movable section 2B referred to herein later. The 5 holding electrode section 14 shown in FIG. 3A are arranged apart from each other in substantially the entire region including the central region on the glass substrate 15. The holding electrode sections 14A corresponding to the fixing electrode 5 on the side of the movable section are electrically connected at the edge portion of the glass plate 15 in one of the side regions in the longitudinal direction of the glass plate 15, and the 2 holding electrode sections 14B corresponding to the fixing electrode 11 on the side of the movable section are electrically connected in the other side regions in the longitudinal direction on the glass plate 15. What should be noted is that the holding electrode sections 14A and 14B are arranged electrically independently so as to control independently the first and second movable sections 2A, 2B.

Stoppers 16 are formed on the side inner surfaces 3A-3, 3A-4 of the stator frame 3A for preventing the side surfaces of the first and second movable sections 2A, 2B from contacting directly the side inner surfaces 3A-3, 3A-4.

Similarly, stoppers (not shown) are formed on the inner surfaces 3A-1, 3A-2 for preventing the movable sections 2A, 2B from being brought into direct contact with the driving electrodes 12, 14.

The construction of each of the two movable sections 2A, 2B will now be described in detail.

Specifically, the first movable section 2A comprises a substantially parallelepiped hollow support body formed of an electric conductive member, the electrodes 4, 5 formed on the outer surfaces of the hollow support body, a lens 6 arranged in the hollow portion of the support body, and a wiring 7 for removing the electric charge from the support body. Likewise, the second movable section 2B comprises a substantially parallelepiped hollow support body formed of an electric conductive member, the electrodes 8, 11 formed on the outer surfaces of the hollow support body, a lens 9 arranged in the hollow portion of the support body, and a wiring 10 for removing the electric charge from the support body. The support body and electrodes 4, 5 may be formed into a unitary configuration.

The first movable section 2A and the second movable section 2B are inserted apart from each other into the through-hole of the support body such that these first and second movable sections 2A and 2B are movable in a predetermined direction.

A driving electrode 4 on the side of the movable section is formed on a surface of the first movable section 2A facing the driving electrode section 12 on the side of the stator, e.g., on the upper surface of the first movable section 2A. Likewise, a fixing electrode 5 on the side of the movable section is formed on a surface of the first movable section 2A facing the holding electrode section 14, e.g., on the lower surface of the first movable electrode 2A. The driving electrode 4 on the side of the movable section is formed by etching in the form of a plurality of projecting stripes extending in a direction perpendicular to the moving direction and arranged in the longitudinal direction. Also, the fixing electrode 5 on the side of the movable section is formed by etching in the form of a plurality of projecting stripes extending in the moving direction and arranged in the lateral direction. The driving electrode 4 on the side of the movable section is formed to comprise concave portions and convex portions with a clearance of about 20 μm provided between the adjacent concave and convex portions. The height of the convex portion from the surface inside the concave portion is about 10 μm. In other words, the edge surface of the convex portion of the driving electrode 4 on the side of the movable section has a width equal to the width of one of the electrodes 12A to 12D of the driving electrode section 12. Also, the bottom surface of the concave portion of the driving electrode 4 on the side of the movable section has a width equal to the clearance between the adjacent electrodes 12A to 12D. The concave or convex portions of the driving electrode 4 on the side of the movable section 4 arranged at a pitch of about 40 μm.

In the actuator shown in FIG. 3A, three holding electrodes 5 extending in the longitudinal direction and arranged in the lateral direction are mounted to the first movable section 2A. Also, a plurality of lenses 6 having aligned optical axes are fixed within the through-hole of the first movable section 2A.

A driving electrode 8 on the side of the movable section having a shape and a dimension equal to those of the driving electrode 4 on the side of the movable section of the first movable section 2A is mounted to the second movable section 2B. Also, a lens 9 similar to the lens 6 is fixed within the through-hole of the second movable section 2B. The lens system formed by the lenses 6 and 9 is zoomed between the wide-angle and telephoto lens systems by changing the arrangement of the lenses 6 and 9 so as to adjust the focus on the subject in accordance with the zoomed focal length. Two holding electrodes 11 extending in the longitudinal direction and arranged in the lateral direction are mounted to the second movable section 2B. The holding electrodes 11 are formed by etching.

As apparent from the above description, the driving electrodes 4, 8 on the side of the movable section are formed such that the concave and convex portions of these driving electrodes 4, 8 are substantially parallel to each other. The holding electrodes 5, 11 on the side of the movable section are also formed such that the concave and convex portions thereof are substantially parallel to each other. The extending directions of the driving electrodes 4, 8 on the side of the movable section are allowed to cross the extending directions of the holding electrodes 5, 11 on the side of the movable section. Also, the holding electrodes 5, 11 on the side of the movable section extend in the longitudinal direction and are arranged in parallel such that these holding electrodes 5, 11 do not overlap with other in the lateral direction.

The first and second movable sections 2A, 2B are arranged in the moving direction, i.e., in the longitudinal direction, and are independently movable in the longitudinal direction.

Figure 4A:
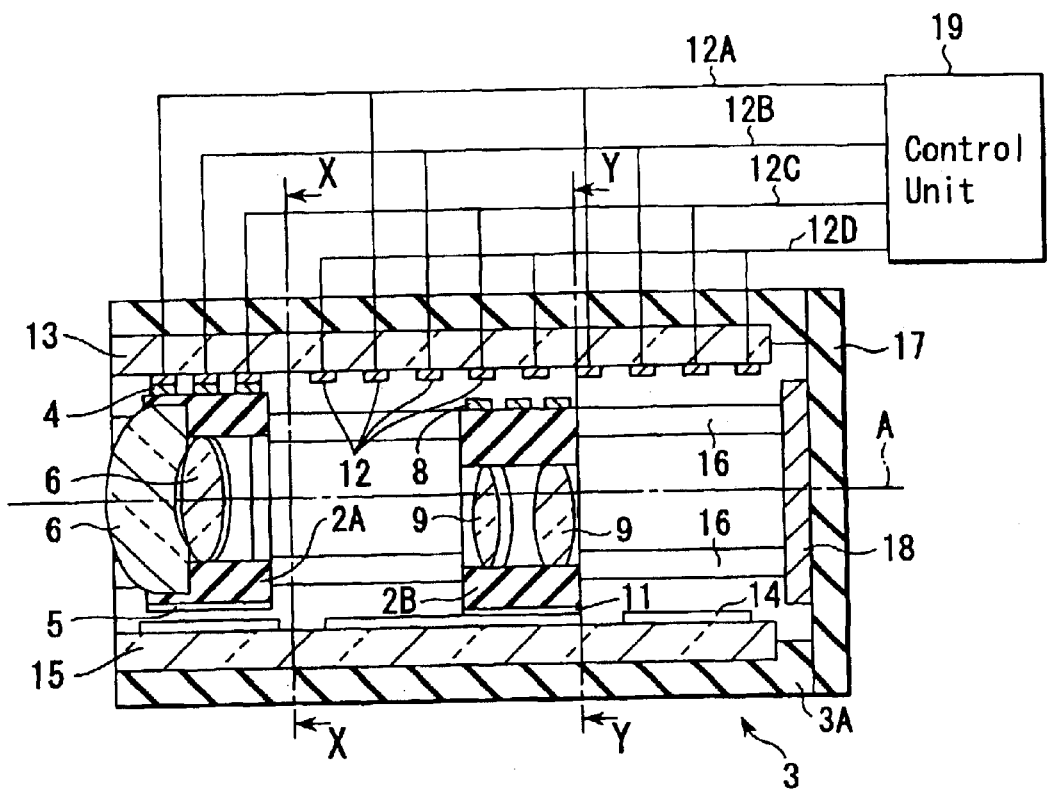
FIG. 4A is a vertical cross sectional view schematically showing the inner structure of the electrostatic actuator shown in FIG. 3A.
Figure 4B:
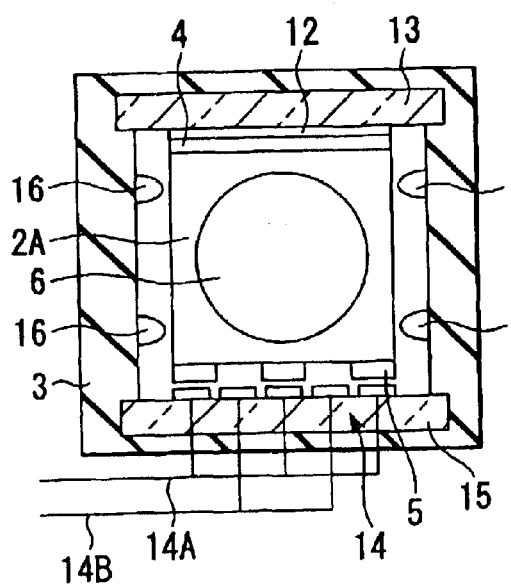
FIG. 4B is a cross sectional view schematically showing the construction of the electrostatic actuator along the line X—X shown in FIG. 4A.
Figure 4C:
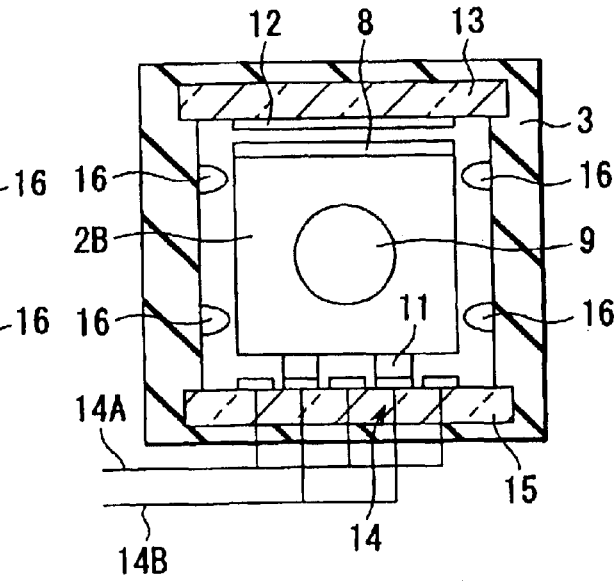
FIG. 4C is a cross sectional view schematically showing the construction of the electrostatic actuator along the line Y—Y shown in FIG. 4A.

The operation of the actuator of the particular construction will now be described with reference to FIGS. 4A to 4D. FIG. 4A is a cross sectional view showing the state that the first and second movable sections 2A, 2B are inserted into the through-hole of the stator frame 3A. FIG. 4B is a lateral cross sectional view along the lines X—X as viewed in the direction denoted by an arrow. Further, FIG. 4C is a lateral cross sectional view along the line Y—Y as viewed in the direction denoted by an arrow.

The driving electrode section 12 is formed of a plurality of electrode groups each consisting of electrodes 12A to 12D of 4 phases arranged in the moving direction, as shown in FIG. 4A. These driving electrodes 12A to 12D are connected to a control unit 19 so as to be driven upon receipt of control voltage signals from the control unit 19. To be more specific, the groups of the driving electrodes 12A to 12D are sequentially arranged in the longitudinal direction, and each of the driving electrodes 12A to 12D are commonly connected to the corresponding driving electrode and connected to the control unit 19, and a voltage signal is applied independently to the driving electrode stripes 12A to 12D of each group. For example, where voltage is applied to the driving electrode 12A, a voltage signal is applied to the convex portion corresponding to the driving electrode 12A of all the groups of the electrode section 12.

As shown in FIG. 4D, it is necessary for the width Wm of the fixing electrode 5 or 11 of the movable section 2A or 2B and the width Ws of the fixing electrode 14 of the stator 3 to be set larger than the allowable moving length ΔL even if the movable section 2A or 2B is moved in the lateral direction within the frame of the stator 3. The allowable moving length ΔL corresponds to a difference between the distance Ls between the stoppers, and the width Lm of the movable section 2A or 2B. The allowable moving length ΔL is produced in the actuator when the movable section 2A or 2B abuts against a stopper 16 mounted to the side surface of one of the stator 5 or 11 and the stopper mounted to one side surface of the stator 5 or 11. In the present invention, each of Wm and Ws is set larger than the allowable moving length ΔL. Difficulties are generated if this requirement is not satisfied. Specifically, if the movable section is moved sideward by the moving length ΔL, the mutually facing electrodes 5 and 14 are deviated from each other. Also, if the overlapping area is made extremely small, the force to fix the movable section 2A ceases to be generated.

Also, the free space between adjacent electrodes 5, adjacent electrodes 11 or adjacent electrodes 14 must be greater than the moving length ΔL. If the number of holding electrodes is increased, the portion where the electrode is not mounted is also increased. This is a disadvantageous condition for generating an attractive force.

It should also be noted that, if the movable sections 2A, 2B have a single electrode 5 and a single electrode 11 respectively, the single electrodes can not be symmetrically arranged in respect to a moving direction of the movable section 2A, 2B so that the movable sections 2A, 2B tend to be moved unstable in the driving step. It follows that it is necessary to mount at least two electrodes to each of the movable sections 2A and 2B.

Such being the situation, in a small actuator having, for example, two systems of stator electrodes as the holding electrodes, it is desirable to employ a combination that two electrodes are mounted to one of the movable sections 2A, 2B and three electrodes are mounted to the other of the movable sections 2A, 2B or another combination that three electrodes are mounted to one of the movable sections 2A, 2B and four electrodes are mounted to the other of the two movable sections 2A, 2B.

There are four operation modes in the first and second movable sections 2A, 2B. Each of these operation modes will now be described.

(I) Where each of the first and second movable sections 2A and 2B is moved to the right in FIG. 4A (hereinafter referred to as mode I):

This operation corresponds to the focusing mode in which the focus of the lens system is aligned on the subject.

(II) Where each of the first and second movable sections 2A and 2B is moved to the left in FIG. 4A (hereinafter referred to as mode II):

This operation also corresponds to the focusing mode in which the focus of the lens system is aligned on the subject.

(III) Where the first movable section 2A is held stationary and the second movable section 2B alone is moved to the left or to the right in FIG. 4A (hereinafter referred to as operation mode III):

This operation corresponds to the zooming mode in which the lens system is switched to the telephoto side or the wide-angle side.

(IV) Where the second movable section 2B is held stationary and the first movable section 2A alone is moved to the left or to the right in FIG. 4A (hereinafter referred to as operation mode IV):

This operation corresponds to the zooming mode in which the lens system is switched to the telephoto side or the wide-angle side.

The four operation modes summarized above will now be described in detail.

(I) Operation mode I in which the first and second movable sections 2A and 2B are moved to the right in FIG. 4A is performed as follows:

(1) In the first step, the driving electrodes 4, 8 of the movable sections 2A, 2B are kept connected to the ground. Under this condition, a voltage H is applied to the driving electrodes 12A as shown in FIG. 5A. As a result, the driving electrodes 4, 8 on the side of the movable section in the vicinity of the driving electrode 12A are attracted by the electrostatic force toward the driving electrode 12A, with the result that the driving electrodes 4, 8 on the side of the movable section are attracted to the driving electrode 12A. It follows that the first and second movable sections 2A, 2B are moved toward the glass plate 13.

(2) In the next step, the voltage of the driving electrode 12A is changed into a low level L at time t1, and a voltage H is applied to the holding electrode sections 14A, 14B as shown in FIGS. 5E and 5F. As a result, a strong electrostatic force is generated between the holding electrode section 14A and the fixing electrode 5 on the side of the movable section so as to permit the first movable section 2A to be moved toward the glass plate 15. It follows that the fixing electrode 5 on the side of the movable section is attracted to the holding electrode section 14A. Also, a strong electrostatic force is generated between the holding electrode section 14B and the fixing electrode 11 on the side of the movable section. As a result, the second movable section 2B is moved toward the glass plate 15 so as to permit the fixing electrode 11 on the side of the movable section to be attracted to the holding electrode section 14B.

(3) In the next step, voltage of the holding electrode sections 14A, 14B is changed into a low level L at time t2, with the result that a voltage H is applied to the driving electrode 12B as shown in FIG. 5B. As a result, the driving electrodes 4, 8 on the side of the movable section in the vicinity of the driving electrode 12B is attracted by an electrostatic force toward the driving electrode 12B, with the result that the driving electrodes 4, 8 on the side of the movable section are attracted to the driving electrode 12B. It follows that the first and second movable electrodes 2A, 2B are moved toward the glass plate 13. In this step, the first and second movable sections 2A, 2B are moved to the right in FIG. 4A by a distance equal to one stripe of the driving electrode section 12, i.e., a distance equal to one pitch, compared with the position described in item (1) above.

(4) In the next step, voltage of the driving electrode 12B is changed to a low level L at time t3, with the result that a voltage H is applied again to the holding electrode sections 14A, 14B, as shown in FIGS. 5E and 5F, so as to generate a strong electrostatic force between the holding electrode section 14A and the fixing electrode 5 on the side of the movable section. It follows that the first movable section 2A is moved toward the glass plate 15 and the fixing electrode 5 on the side of the movable section is attracted to the holding electrode section 14A. Also, a strong electrostatic force is generated between the holding electrode section 14B and the fixing electrode 11 on the side of the movable section. As a result, the second movable section 2B is moved toward the glass plate 15, and the fixing electrode 11 on the side of the movable section is attracted to the holding electrode section 14B.

(5) Further, the voltage of the holding electrode sections 14A, 14B is changed into a low level L at time t4, with the result that a voltage is applied to the driving electrode 12C, as shown in FIG. 5C. In this case, the driving electrodes 4, 8 on the side of the movable section in the vicinity of the driving electrode 12C are attracted by an electrostatic force toward the driving electrode 12C such that the driving electrodes 4, 8 on the side of the movable section are attracted to the driving electrode 12C. As a result, the first and second movable sections 2A, 2B are moved toward the glass plate 13. In this case, the first and second movable sections 2A, 2B are moved to the right in FIG. 4A by a distance equal to two stripes of the driving electrode section 12, i.e., a distance equal to two pitches, compared with the position described in item (1) above.

(6) In the next step, voltage of the driving electrode 12C is changed to a low level L at time t5, with the result that a voltage is applied again to the holding electrode sections 14A, 14B, as shown in FIGS. 5E and 5F, so as to generate a strong electrostatic force between the holding electrode section 14A and the fixing electrode 5 on the side of the movable section. It follows that the first movable section 2A is moved toward the glass plate 15 and the fixing electrode 5 on the side of the movable section is attracted to the holding electrode section 14A. Also, a strong electrostatic force is generated between the holding electrode section 14B and the fixing electrode 11 on the side of the movable section. As a result, the second movable section 2B is moved toward the glass plate 15, and the fixing electrode 11 on the side of the movable section is attracted to the holding electrode section 14B.

(7) In the next step, the voltage of the holding electrode sections 14A, 14B is changed into a low level L at time t6, with the result that a voltage is applied to the driving electrode 12D, as shown in FIG. 5D. In this case, the driving electrodes 4, 8 on the side of the movable section in the vicinity of the driving electrode 12D are attracted by an electrostatic force toward the driving electrode 12D such that the driving electrodes 4, 8 on the side of the movable section are attracted to the driving electrode 12D. As a result, the first and second movable sections 2A, 2B are moved toward the glass plate 13. In this case, the first and second movable sections 2A, 2B are moved to the right in FIG. 4A by a distance equal to three stripes of the driving electrode section 12, i.e., a distance equal to three pitches, compared with the position described in item (1) above.

(8) In the next step, voltage of the driving electrode 12D is changed to a low level L at time t7, with the result that a voltage is applied again to the holding electrode sections 14A, 14B, as shown in FIGS. 5E and 5F, so as to generate a strong electrostatic force between the holding electrode section 14A and the fixing electrode 5 on the side of the movable section. It follows that the first movable section 2A is moved toward the glass plate 15 and the fixing electrode 5 on the side of the movable section is attracted to the holding electrode section 14A. Also, a strong electrostatic force is generated between the holding electrode section 14B and the fixing electrode 11 on the side of the movable section. As a result, the second movable section 2B is moved toward the glass plate 15, and the fixing electrode 11 on the side of the movable section is attracted to the holding electrode section 14B.

(9) Further, the voltage of the holding electrode sections 14A, 14B is changed into a low level L at time t8, with the result that a voltage is applied to the driving electrode section 12A, as shown in FIG. 5A. In this case, the driving electrodes 4, 8 on the side of the movable section in the vicinity of the driving electrode section 12A are attracted by an electrostatic force toward the driving electrode section 12A such that the driving electrodes 4, 8 on the side of the movable section are attracted to the driving electrode 12C. As a result, the first and second movable sections 2A, 2B are moved toward the glass plate 13. In this case, the first and second movable sections 2A, 2B are moved to the right in FIG. 4A by a distance equal to four stripes of the driving electrode section 12, i.e., a distance equal to four pitches, compared with the position described in item (1) above.

The steps of items (1) to (9) described above are repeated until the first and second movable sections 2A, 2B are moved by a desired distance.

(II) Operation mode II in which the first and second movable sections 2A, 2B are both moved to the left in FIG. 4A will now be described.

The first and second movable sections 2A, 2B can be moved to the left in FIG. 4A if the steps for operation mode I described above are carried out in the opposite direction. To be more specific, the first and second movable sections 2A, 2B can be moved to the right left in FIG. 4A by repeating the steps for operation mode I in the order of steps (9), (8), (7), (6), (5), (4), (3), (2) and (1). Of course, the number of repetitions is determined in accordance with the desired distance of movement of the first and second movable sections 2A, 2B.

It should be noted that each of operation modes I and II is an operation of the focusing mode for aligning the focus on the subject. Whether to employ operation mode I or II is determined appropriately depending on the initial positions of the first and second movable sections 2A, 2B and on the direction of the movement of the first and second movable sections 2A, 2B which permits achieving the focusing in a shorter time.

(III) Operation mode III in which the first movable section 2A is held stationary and the second movable section 2B alone is moved to the left or to the right in FIG. 4A will now be described.

Let us describe first the case where the second movable section 2B is moved to the right in FIG. 4A.

(1) In the first step, the driving electrodes 4, 8 of the movable sections 2A, 2B are kept connected to the ground as in operation mode I described previously. Then, a voltage is applied to the holding electrode section 14B as shown in FIG. 6F. As a result, an electrostatic force is generated between the holding electrode section 14B and the fixing electrode 5 on the side of the movable section. It follows that the second movable section 2B is moved toward the glass plate 15, and the fixing electrode 5 on the side of the movable section is attracted to the holding electrode section 14B. Where voltage is applied to the holding electrode section 14A as shown in FIG. 6E, the first movable section 2A is attracted to and fixed temporarily to the glass plate 15.

(2) In the next step, a voltage H is applied to the driving electrode 12A at time t1 as shown in FIG. 6A, with the voltage H kept applied to the holding electrode section 14A as shown in FIG. 6E. As a result, the driving electrode 8 on the side of the movable section 2B in the vicinity of the driving electrode 12A is attracted by an electrostatic force, with the result that the driving electrode 8 on the side of the movable section 2B is attracted to the driving electrode 12A. It follows that the second movable section 2B is moved toward the glass plate 13. On the other hand, since the voltage H is kept applied to the holding electrode section 14A, the first movable section 2A is kept fixed on the side of the glass plate 15.

(3) In the next step, a voltage H is applied to the holding electrode section 14B at time t2 as shown in FIG. 6F, with voltage kept applied to the holding electrode section 14A. It follows that a strong electrostatic force is generated between the holding electrode section 14B and the fixing electrode 11 on the side of the movable section. As a result, the second movable section 2B is moved toward the glass plate 15, and the fixing electrode 11 on the side of the movable section 2B is attracted to the holding electrode section 14B.

(4) In the next step, a voltage H is applied to the driving electrode 12B at time t3 as shown in FIG. 6B with the voltage kept applied to the holding electrode section 14A. As a result, the driving electrode 8 on the side of the movable section 2B in the vicinity of the driving electrode 12B is attracted toward the driving electrode 12B by an electrostatic force, and the driving electrode 8 on the side of the movable section 2B is attracted to the driving electrode 12B. It follows that the second movable section 2B is moved toward the glass plate 13. On the other hand, the first movable section 2A is similarly kept fixed on the side of the glass plate 15. In this case, the second movable section 2B is moved to the right in FIG. 4A by a distance equal to one stripe of the driving electrode section 12, i.e., a distance equal to one pitch, compared with the position described in item (1) above.

(5) In the next step, a voltage H is applied to the holding electrode section 14B at time t4 as shown in FIG. 6F, with voltage kept applied to the holding electrode section 14A. It follows that a strong electrostatic force is generated between the holding electrode section 14B and the fixing electrode 11 on the side of the movable section 2B. As a result, the second movable section 2B is moved toward the glass plate 15, and the fixing electrode 11 on the side of the movable section is attracted to the holding electrode section 14B.

(6) In the next step, a voltage is applied to the driving electrode 12C at time t5 as shown in FIG. 6C with the voltage kept applied to the holding electrode section 14A. As a result, the driving electrode 8 on the side of the movable section 2B in the vicinity of the driving electrode 12C is attracted toward the driving electrode 12C by an electrostatic force, and the driving electrode 8 on the side of the movable section is attracted to the driving electrode 12C. It follows that the second movable section 2B is moved toward the glass plate 13. On the other hand, the first movable section 2A is similarly kept fixed on the side of the glass plate 15. In this case, the second movable section 2B is moved to the right in FIG. 4A by a distance equal to two stripes of the driving electrode section 12, i.e., a distance equal to two pitches, compared with the position described in item (1) above.

(7) In the next step, a voltage H is applied to the holding electrode section 14B at time t6 as shown in FIG. 6F, with voltage kept applied to the holding electrode section 14A. It follows that a strong electrostatic force is generated between the holding electrode section 14B and the fixing electrode 11 on the side of the movable section 2B. As a result, the second movable section 2B is moved toward the glass plate 15, and the fixing electrode 11 on the side of the movable section 2B is attracted to the holding electrode section 14B.

(8) In the next step, a voltage is applied to the driving electrode stripe 12D at time t7 as shown in FIG. 6D with the voltage kept applied to the holding electrode section 14A. As a result, the driving electrode 8 on the side of the movable section 2B in the vicinity of the driving electrode stripe 12D is attracted toward the driving electrode section 12D by an electrostatic force, and the driving electrode 8 on the side of the movable section 2B is attracted to the driving electrode section 12D. It follows that the second movable section 2B is moved toward the glass plate 13. On the other hand, the first movable section 2A is similarly kept fixed on the side of the glass plate 15. In this case, the second movable section 2B is moved to the right in FIG. 4A by a distance equal to three stripes of the driving electrode section 12, i.e., a distance equal to three pitches, compared with the position described in item (1) above.

(9) In the next step, a voltage is applied to the holding electrode section 14B at time t8 as shown in FIG. 6F, with voltage kept applied to the holding electrode section 14A. It follows that a strong electrostatic force is generated between the holding electrode section 14B and the fixing electrode 11 on the side of the movable section. As a result, the second movable section 2B is moved toward the glass plate 15, and the fixing electrode 11 on the side of the movable section is attracted to the holding electrode section 14B.

(10) In the next step, a voltage is applied to the driving electrode 12A at time t9 as shown in FIG. 6A with the voltage kept applied to the holding electrode section 14A. As a result, the driving electrode 8 on the side of the movable section in the vicinity of the driving electrode 12A is attracted toward the driving electrode section 12A by an electrostatic force, and the driving electrode 8 on the side of the movable section is attracted to the driving electrode 12A. It follows that the second movable section 2B is moved toward the glass plate 13. On the other hand, the first movable section 2A is similarly kept fixed on the side of the glass plate 15. In this case, the second movable section 2B is moved to the right in FIG. 4A by a distance equal to four stripes of the driving electrode section 12, i.e., a distance equal to four pitches, compared with the position described in item (1) above.

The steps of items (1) to (10) described above are repeated until the second movable section 2B is moved by a desired distance.

Also, where it is intended to move the second movable section 2B to the left in FIG. 4A, the steps of items (1), (10), (9), (8), (7), (6), (5), (4), (3) and (2) in the operation mode III described above are repeated in the order mentioned so as to move the second movable section 2B by a desired distance.

(IV) Operation mode IV in which the second movable section 2B is held stationary and the first movable section 2A alone is moved to the left or to the right in FIG. 4A will now be described.

Let us describe first the case where the first movable section 2A is moved to the right in FIG. 4A.

(1) In the first step, the driving electrodes 4, 8 of the movable sections 2A, 2B are kept connected to the ground as in operation mode I described previously. Then, a voltage H is applied to the holding electrode section 14A as shown in FIG. 7E. As a result, an electrostatic force is generated between the holding electrode section 14A and the fixing electrode 11 on the side of the movable section. It follows that the first movable section 2A is moved toward the glass plate 15, and the fixing electrode 5 on the side of the movable section 2A is attracted to the holding electrode section 14A. Where voltage is applied to the holding electrode section 14B as shown in FIG. 7F, the second movable section 2B is attracted to and fixed to the glass plate 15.

(2) In the next step, a voltage H is applied to the driving electrode 12A at time t1 as shown in FIG. 7A, with the voltage H kept applied to the holding electrode section 14B as shown in FIG. 7F. As a result, the driving electrode 4 on the side of the movable section 2A in the vicinity of the driving electrode 12A is attracted by an electrostatic force to the driving electrode 12A, with the result that the driving electrode 4 on the side of the movable section 2A is attracted to the driving electrode 12A. It follows that the first movable section 2A is moved toward the glass plate 13. On the other hand, since the voltage H is kept applied to the holding electrode section 14B, the second movable section 2B is kept fixed on the side of the glass plate 15.

(3) In the next step, a voltage H is applied to the holding electrode section 14A at time t2 as shown in FIG. 7F, with voltage kept applied to the holding electrode section 14B. It follows that a strong electrostatic force is generated between the holding electrode section 14A and the fixing electrode 5 on the side of the movable section 2A. As a result, the first movable section 2A is moved toward the glass plate 15, and the fixing electrode 5 on the side of the movable section 2A is attracted to the holding electrode section 14A.

(4) In the next step, a voltage H is applied to the driving electrode 12B at time t3 as shown in FIG. 7B with the voltage kept applied to the holding electrode section 14B. As a result, the driving electrode 4 on the side of the movable section 2A in the vicinity of the driving electrode 12B is attracted toward the driving electrode 12B by an electrostatic force, and the driving electrode 4 on the side of the movable section 2A is attracted to the driving electrode 12B. It follows that the first movable section 2A is moved toward the glass plate 13. On the other hand, the second movable section 2B is similarly kept fixed on the side of the glass plate 15. In this case, the first movable section 2A is moved to the right in FIG. 4A by a distance equal to one stripe of the driving electrode section 12, i.e., a distance equal to one pitch, compared with the position described in item (1) above.

(5) In the next step, a voltage H is applied to the holding electrode section 14A at time t4 as shown in FIG. 7E, with voltage kept applied to the holding electrode section 14B. It follows that a strong electrostatic force is generated between the holding electrode section 14A and the fixing electrode 5 on the side of the movable section 2A. As a result, the first movable section 2A is moved toward the glass plate 15, and the fixing electrode 5 on the side of the movable section 2A is attracted to the holding electrode section 14A.

(6) In the next step, a voltage H is applied to the driving electrode 12C at time t5 as shown in FIG. 7C with the voltage kept applied to the holding electrode section 14B. As a result, the driving electrode 4 on the side of the movable section 2A in the vicinity of the driving electrode 12C is attracted toward the driving electrode 12C by an electrostatic force, and the driving electrode 4 on the side of the movable section 2A is attracted to the driving electrode 12C. It follows that the first movable section 2A is moved toward the glass plate 13. On the other hand, the second movable section 2B is similarly kept fixed on the side of the glass plate 15. In this case, the first movable section 2A is moved to the right in FIG. 4A by a distance equal to two stripes of the driving electrode section 12, i.e., a distance equal to two pitches, compared with the position described in item (1) above.

(7) In the next step, a voltage H is applied to the holding electrode section 14A at time t6 as shown in FIG. 7E, with voltage kept applied to the holding electrode section 14B. It follows that a strong electrostatic force is generated between the holding electrode section 14A and the fixing electrode 5 on the side of the movable section 2A. As a result, the first movable section 2A is moved toward the glass plate 15, and the fixing electrode 5 on the side of the movable section is attracted to the holding electrode section 14A.

(8) In the next step, a voltage H is applied to the driving electrode stripe 12D at time t7 as shown in FIG. 7D with the voltage kept applied to the holding electrode section 14B. As a result, the driving electrode 4 on the side of the movable section 2A in the vicinity of the driving electrode stripe 12D is attracted toward the driving electrode section 12D by an electrostatic force, and the driving electrode 4 on the side of the movable section 2A is attracted to the driving electrode section 12D. It follows that the first movable section 2A is moved toward the glass plate 13. On the other hand, the second movable section 2B is similarly kept fixed tempo-rarily on the side of the glass plate 15. In this case, the first movable section 2A is moved to the right in FIG. 4A by a distance equal to three stripes of the driving electrode section 12, i.e., a distance equal to three pitches, compared with the position described in item (1) above.

(9) In the next step, a voltage H is applied to the holding electrode section 14A at time t8 as shown in FIG. 7E, with voltage kept applied to the holding electrode section 14B. It follows that a strong electrostatic force is generated between the holding electrode section 14A and the fixing electrode 5 on the side of the movable section. As a result, the first movable section 2A is moved toward the glass plate 15, and the fixing electrode 5 on the side of the movable section 2A is attracted to the holding electrode section 14A.

(10) In the next step, a voltage H is applied to the driving electrode 12A at time t9 as shown in FIG. 7A with the voltage kept applied to the holding electrode section 14B. As a result, the driving electrode 4 on the side of the movable section 2A in the vicinity of the driving electrode 12A is attracted toward the driving electrode section 12A by an electrostatic force, and the driving electrode 4 on the side of the movable section 2A is attracted to the driving electrode 2A. It follows that the first movable section 2A is moved toward the glass plate 13. On the other hand, the second movable section 2B is temporarily kept fixed on the side of the glass plate 15. In this case, the first movable section 2A is moved to the right in FIG. 4A by a distance equal to four stripes of the driving electrode section 12, i.e., a distance equal to four pitches, compared with the position described in item (1) above.

The steps of items (1) to (10) described above are repeated until the first movable section 2A is moved by a desired distance.

Also, where it is intended to move the first movable section 2A to the left in FIG. 4A, the steps of items (1), (10), (9), (8), (7), (6), (5), (4), (3) and (2) in the operation mode III described above are repeated in the order mentioned so as to move the first movable section 2A by a desired distance.

It should be noted that each of operation modes III and IV is an operation for magnifying or reducing the photographed image. Whether to employ operation mode III or IV is determined appropriately depending on the initial positions of the first and second movable sections 2A, 2B and on the direction of the movement of the first and second movable sections 2A, 2B which permits achieving the magnification or reduction in a shorter time.

Incidentally, FIG. 4B shows that the first movable section 2A is moved toward the glass plate 13, and FIG. 4C shows that the second movable section 2B is moved toward the glass plate 15.

Figure 8A:
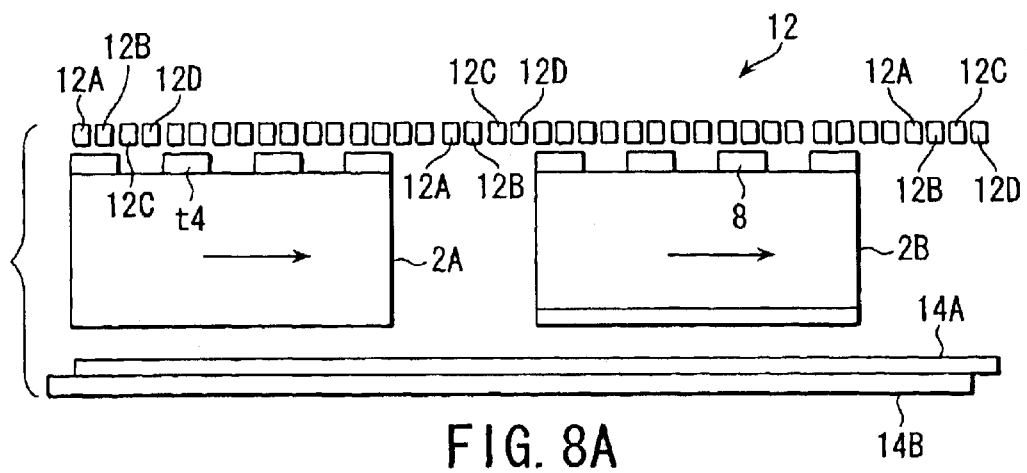
FIGS. 8A to 8C are cross sectional views directed to a modification of the electrostatic actuator shown in FIG. 4A and each showing schematically the operating states of two movable sections.
Figure 8B:
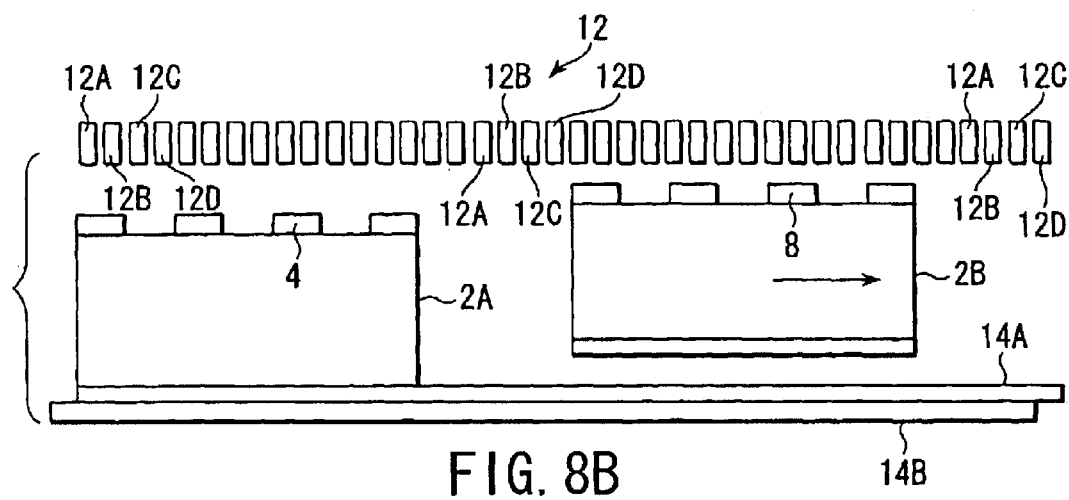
Figure 8C:
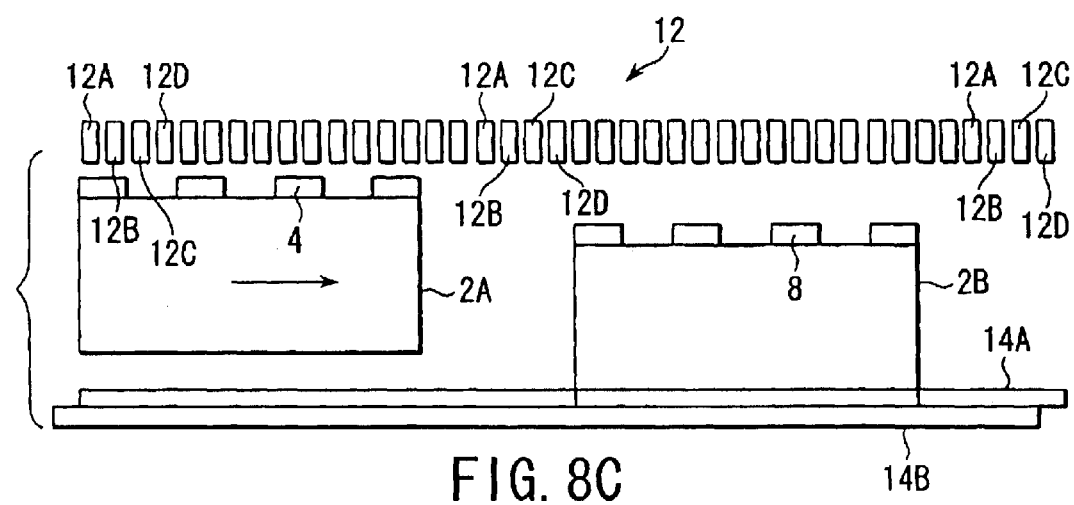

In the actuator shown in FIG. 4A, each of the driving electrodes 12A to 12D of the driving electrode section 12 is set substantially equal to the width of each of the driving electrodes 4 and 8 on the side of the movable section and the arranging pitch of these driving electrodes 12A to 12D is set constant. As a modification of the actuator, it is possible for each of the driving electrodes 12A to 12D of the driving electrode section 12 to be set not larger than ½ of the width of each of the driving electrodes 4 and 8 on the side of the movable section and for the arranging pitch of the driving electrodes 12A to 12D to be set at ¼ of that of each of the driving electrodes 4 and 8 on the side of the movable section, as shown in. FIGS. 8A to 8C. In the actuator of the particular construction, if the movable sections 2A, 2B are attracted toward the driving electrodes 12A to 12D of the driving electrode section 12, each of the driving electrodes 4 and 8 on the side of the movable section is allowed to face two of the driving electrodes 12A to 12D, as shown in FIGS. 8A to 8C.

The operation of the actuator shown in FIGS. 8A to 8C will now be described with reference to FIGS. 9A to 9F, FIGS. 10A to 10F and FIGS. 11A to 11F.

(I) Operation mode I in which the first and second movable sections 2A, 2B are simultaneously moved to the right as shown in FIG. 5A is performed as follows.

(1) In the first step, the driving electrodes 4, 8 of the movable sections 2A, 2B are held connected to the ground. Under this condition, a voltage H is applied to the driving electrodes 12A and 12B as shown in FIGS. 9A and 9B. As a result, the driving electrodes 4, 8 on the side of the movable sections in the vicinity of the driving electrodes 12A, 12B are attracted toward the driving electrodes 12A, 12B by an electrostatic force, with the result that the driving electrodes 4, 8 on the side of the movable sections are attracted to the driving electrode 12A. It follows that the first and second movable sections 2A, 2B are moved toward the glass plate 13.

(2) In the next step, the voltage of the driving electrodes 12A and 12B is changed into a low level at time t1 as shown in FIGS. 9A and 9B, and a voltage H is applied to the holding electrodes sections 14A, 14B as shown in FIGS. 9E and 9F. It follows that a strong electrostatic force is generated between the holding electrode section 14A and the fixing electrode 5 on the side of the movable section 2A. As a result, the first movable section 2A is moved toward the glass plate 15, and the fixing electrode 5 on the side of the movable section 2A is attracted to the holding electrode section 14A. Also, a strong electrostatic force is generated between the holding electrode section 14B and the fixing electrode 11 on the side of the movable section 2B. As a result, the second movable section 2B is moved toward the glass plate 15, and the fixing electrode 11 on the side of the movable section is attracted to the holding electrode section 14B.

(3) In the next step, the voltage of the holding electrode sections 14A, 14B is changed into a low level L at time t2 as shown in FIGS. 9E and 9F, and a voltage H is applied to the driving electrodes 12B and 12C as shown in FIGS. 9B and 9C. As a result, the driving electrodes 4, 8 on the side of the movable sections 2A, 2B in the vicinity of the driving electrodes 12B, 12C are attracted toward the driving electrodes 12B, 12C by an electrostatic force, and the driving electrodes 4, 8 on the side of the movable sections 2A, 2B are attracted to the driving electrodes 12B, 12C. It follows that the first and second movable sections 2A, 2B are moved toward the glass plate 13. In this case, the first and second movable sections 2A, 2B are moved to the right in FIG. 8A by a distance equal to one stripe of the driving electrode section 12, i.e., a distance equal to one pitch, compared with the position described in item (1) above.

(4) In the next step, the voltage of the driving electrodes 12B and 12C is changed into a low level L at time t3, and a voltage H is applied again to the holding electrodes sections 14A, 14B as shown in FIGS. 9E and 9F. It follows that a strong electrostatic force is generated between the holding electrode section 14A and the fixing electrode 5 on the side of the movable section 2A. As a result, the first movable section 2A is moved toward the glass plate 15, and the fixing electrode 5 on the side of the movable section 2A is attracted to the holding electrode section 14A. Also, a strong electrostatic force is generated between the holding electrode section 14B and the fixing electrode 11 oh the side of the movable section 2B. As a result, the second movable section 2B is moved toward the glass plate 15, and the fixing electrode 11 on the side of the movable section 2B is attracted to the holding electrode section 14B.

(5) Further, the voltage of the holding electrode sections 14A, 14B is changed into a low level L at time t4, and a voltage is applied to the driving electrodes 12C and 12D as shown in FIGS. 9C and 9D. As a result, the driving electrodes 4, 8 on the side of the movable sections in 2A, 2B the vicinity of the driving electrodes 12C, 12D are attracted toward the driving electrodes 12C, 12D by an electrostatic force, and the driving electrodes 4, 8 on the side of the movable sections 2A, 2B are attracted to the driving electrodes 12C, 12D. It follows that the first and second movable sections 2A, 2B are moved toward the glass plate 13. In this case, the first and second movable sections 2A, 2B are moved to the right in FIG. 8A by a distance equal to two stripes of the driving electrode section 12, i.e., a distance equal to two pitches, compared with the position described in item (1) above.

(6) In the next step, the voltage of the driving electrodes 12C and 12D is changed into a low level L at time t5, and a voltage is applied again to the holding electrodes sections 14A, 14B as shown in FIGS. 9E and 9F. It follows that a strong electrostatic force is generated between the holding electrode section 14A and the fixing electrode 5 on the side of the movable section 2A. As a result, the first movable section 2A is moved toward the glass plate 15, and the fixing electrode 5 on the side of the movable section 2A is attracted to the holding electrode section 14A. Also, a strong electrostatic force is generated between the holding electrode section 14B and the fixing electrode 11 on the side of the movable section 2B. As a result, the second movable section 2B is moved toward the glass plate 15, and the fixing electrode 11 on the side of the movable section 2B is attracted to the holding electrode section 14B.

(7) In the next step, the voltage of the holding electrode sections 14A, 14B is changed into a low level L at time t6, and a voltage H is applied to the driving electrodes 12D and 12A as shown in FIGS. 9D and 9A. As a result, the driving electrodes 4, 8 on the side of the movable sections 2A, 2B in the vicinity of the driving electrodes 12D, 12A are attracted toward the driving electrode stripes 12B, 12A by an electrostatic force, and the driving electrodes 4, 8 on the side of the movable sections 2A, 2B are attracted to the driving electrodes 12D, 12A. It follows that the first and second movable sections 2A, 2B are moved toward the glass plate 13. In this case, the first and second movable sections 2A, 2B are moved to the right in FIG. 8A by a distance equal to three stripes of the driving electrode section 12, i.e., a distance equal to three pitches, compared with the position described in item (1) above.

(8) In the next step, the voltage of the driving electrodes 12D, 12A is changed into a low level L at time t7, and a voltage H is applied again to the holding electrodes sections 14A, 14B as shown in FIGS. 9E and 9F. It follows that a strong electrostatic force is generated between the holding electrode section 14A and the fixing electrode 5 on the side of the movable section 2A. As a result, the first movable section 2A is moved toward the glass plate 15, and the fixing electrode 5 on the side of the movable section is attracted to the holding electrode section 14A. Also, a strong electrostatic force is generated between the holding electrode section 14B and the fixing electrode 11 on the side of the movable section 2B. As a result, the second movable section 2B is moved toward the glass plate 15, and the fixing electrode 11 on the side of the movable section 2B is attracted to the holding electrode section 14B.

(9) Further, the voltage of the holding electrode sections 14A, 14B is changed into a low level L at time t8, and a voltage is applied again to the driving electrodes 12A and 12B as shown in FIGS. 9A and 9B. As a result, the driving electrodes 4, 8 on the side of the movable sections 2A, 2B in the vicinity of the driving electrodes 12A and 12B are attracted toward the driving electrodes 12A and 12B by an electrostatic force, and the driving electrodes 4, 8 on the side of the movable sections 2A, 2B are attracted to the driving electrodes 12A and 12B. It follows that the first and second movable sections 2A, 2B are moved toward the glass plate 13. In this case, the first and second movable sections 2A, 2B are moved to the right in FIG. 8A by a distance equal to four pitches, compared with the position described in item (1) above.

The steps of items (1) to (9) described above are repeated so as to move the first and second movable sections 2A, 2B by a desired distance.

(II) Where the first and second movable sections 2A, 2B are moved to the left in FIG. 8A. the steps of operation mode I described above are carried out in the opposite direction. To be more specific, the steps in items (9), (8), (7), (6), (5), (4), (3), (2) and (1) for operation mode I described above are carried out in the order mentioned so as to move the first and second movable sections 2A, 2B to the left in FIG. 8A by a desired distance.

(III) Operation to move the second movable section 2B alone to the left or to the right with the first movable section 2A held stationary.

Let us describe first the case where the second movable section 2B is moved to the right as shown in FIG. 8B.

(1) In the first step, the driving electrodes 4, 8 of the movable sections 2A., 2B are held connected to the ground. Under this condition, a voltage is applied to the holding electrode section 14B as shown in FIG. 10F. As a result, an electrostatic force is generated between the holding electrode section 14B and the fixing electrode 5 on the side of the movable section. It follows that the second movable section 2B is moved toward the glass plate 15, and the fixing electrode 5 on the side of the movable section is attracted to the holding electrode section 14B. In this case, the first movable section 2A is moved toward any of the glass plates 13, 15 and fixed temporarily. Where a voltage is applied to the holding electrode section 14A as shown in FIG. 10E, the first movable section 2A is attracted to the glass plate 15 and continues to be fixed.

(2) In the next step, a voltage H is applied to the driving electrodes 12A and 12B at time t1 as shown in FIGS. 10A and 10B, with the voltage H kept applied to the holding electrode section 14A as shown in FIG. 10E. As a result, the driving electrode 8 on the side of the movable section 2B in the vicinity of the driving electrodes 12A and 12B are attracted toward the driving electrodes 12A and 12B by an electrostatic force, and the driving electrode 8 on the side of the movable section 2B are attracted to the driving electrodes 12A and 12B. It follows that the second movable section 2B is moved toward the glass plate 13. On the other hand, since the voltage H is kept applied to the holding electrode 14A, the first movable section 2A is kept fixed on the side of the glass plate 15.

(3) In the next step, a voltage H is applied to the holding electrode 14B at time t2 as shown in FIG. 10F, with the voltage kept applied to the holding electrode 14A. As a result, a strong electrostatic force is generated between the holding electrode 14B and the fixing electrode 11 on the side of the movable section 2B. It follows that the second movable section 2B is moved toward the glass plate 15, and the fixing electrode 11 on the side of the movable section 2B is attracted to the holding electrode 14B.

(4) In the next step, a voltage H is applied to the driving electrodes 12B and 12C at time t3 as shown in FIGS. 10B and 10C, with the voltage kept applied to the holding electrode 14A. As a result, the driving electrode 8 on the side of the movable section 2B in the vicinity of the driving electrodes 12B and 12C is attracted toward the driving electrodes 12B and 12C by an electrostatic force, with the result that the driving electrode 8 on the side of the movable section 2B is attracted to the driving electrodes 12B and 12C. It follows that the second movable section 2B is moved toward the glass plate 13. On the other hand, the first movable section 2A is similarly kept fixed on the side of the glass plate 15. In this case, the second movable section 2B is moved to the right in FIG. 8B by a distance equal to one stripe of the driving electrode section 12, i.e., a distance equal to one pitch, compared with the position described in item (1) above.

(5) In the next step, a voltage H is applied to the holding electrode 14B at time t4 as shown in FIG. 10F, with the voltage kept applied to the holding electrode 14A. As a result, a strong electrostatic force is generated between the holding electrode 14B and the fixing electrode 11 on the side of the movable section 2B. It follows that the second movable section 2B is moved toward the glass plate 15, and the fixing electrode 11 on the side of the movable section 2B is attracted to the holding electrode section 14B.

(6) In the next step, a voltage is applied to the driving electrodes 12C electrodes 12C and 12D at time t5 as shown in FIGS. 10C and 10D, with the voltage kept applied to the holding electrode 14A. As a result, the driving electrode 8 on the side of the movable section 2B in the vicinity of the driving electrodes 12C electrodes 12C and 12D is attracted toward the driving electrodes 12C by an electrostatic force, with the result that the driving electrode 8 on the side of the movable section 2B is attracted to the driving electrodes 12C electrodes 12C and 12D. It follows that the second movable section 2B is moved toward the glass plate 13. On the other hand, the first movable section 2A is similarly kept fixed on the side of the glass plate 15. In this case, the second movable section 2B is moved to the right in FIG. 8B by a distance equal to two stripes of the driving electrode section 12, i.e., a distance equal to two pitches, compared with the position described in item (1) above.

(7) In the next step, a voltage H is applied to the holding electrode 14B at time t6 as shown in FIG. 10F, with the voltage kept applied to the holding electrode 14A. As a result, a strong electrostatic force is generated between the holding electrode 14B and the fixing electrode 11 on the side of the movable section 2B. It follows that the second movable section 2B is moved toward the glass plate 15, and the fixing electrode 11 on the side of the movable section 2B is attracted to the holding electrode section 14B.

(8) In the next step, a voltage is applied to the driving electrodes 12D and 12A at time t7 as shown in FIGS. 10D and 10A, with the voltage kept applied to the holding electrode 14A. As a result, the driving electrode 8 on the side of the movable section in the vicinity of the driving electrodes 12D and 12A is attracted toward the driving electrodes 12D and 12A by an electrostatic force, with the result that the driving electrode 8 on the side of the movable section is attracted to the driving electrodes 12D and 12A. It follows that the second movable section 2B is moved toward the glass plate 13. On the other hand, the first movable section 2A is similarly kept fixed on the side of the glass plate 15. In this case, the second movable section 2B is moved to the right in FIG. 8B by a distance equal to three stripes of the driving electrode section 12, i.e., a distance equal to three pitches, compared with the position described in item (1) above.

(9) In the next step, a voltage is applied to the holding electrode 14B at time t8 as shown in FIG. 10F, with the voltage kept applied to the holding electrode section 14A. As a result, a strong electrostatic force is generated between the holding electrode section 14B and the fixing electrode 11 on the side of the movable section. It follows that the second movable section 2B is moved toward the glass plate 15, and the fixing electrode 11 on the side of the movable section is attracted to the holding electrode section 14B.

(10) Further, a voltage is applied to the driving electrodes 12A and 12B at time t9 as shown in FIGS. 10A and 10B, with the voltage kept applied to the holding electrode 14A. As a result, the driving electrode 8 on the side of the movable section in the vicinity of the driving electrodes 12A and 12B is attracted toward the driving electrodes 12A and 12B by an electrostatic force, with the result that the driving electrode 8 on the side of the movable section is attracted to the driving electrodes 12A and 12B. It follows that the second movable section 2B is moved toward the glass plate 13. On the other hand, the first movable section 2A is similarly kept fixed on the side of the glass plate 15. In this case, the second movable section 2B is moved to the right in FIG. 8B by a distance equal to four stripes of the driving electrode section 12, i.e., a distance equal to four pitches, compared with the position described in item (1) above.

The steps of items (1) to (10) described above are repeated so as to move the second movable sections 2B by a desired distance.

Where it is desired to move the second movable section 28 to the right kill, the steps of operation mode III described above are carried out in the order of items (1), (10), (9), (8), (7), (6), (5), (4), (3) and (2) described above so as to move the second movable section 2B to the left by a desired distance.

(IV) Operation to move the first movable section 2A alone to the left or to the right with the second movable section 2B held stationary.

Let us describe first the case where the first movable section 2A is moved to the right as shown in FIG. 8C.

(1) In the first step, the driving electrodes 4, 8 of the movable sections 2A, 2B are held connected to the ground. Under this condition, a voltage is applied to the holding electrode section 14A as shown in FIG. 11E. As a result, an electrostatic force is generated between the holding electrode section 14A and the fixing electrode 11 on the side of the movable section 2A. It follows that the first movable section 2A is moved toward the glass plate 15, and the fixing electrode 5 on the side of the movable section 2A is attracted to the holding electrode section 14A. Where a voltage is applied to the holding electrode section 14B as shown in FIG. 11F, the second movable section 2B is attracted to the glass plate 15 and continues to be fixed.

(2) In the next step, a voltage H is applied to the driving electrodes 12A and 12B at time t1 as shown in FIGS. 11A and 11B, with the voltage H kept applied to the holding electrode section 14B as shown in FIG. 11F. As a result, the driving electrode 4 on the side of the movable section 2A in the vicinity of the driving electrodes 12A and 12B is attracted toward the driving electrodes 12A and 12B by an electrostatic force, and the driving electrode 4 on the side of the movable section 2A is attracted to the driving electrodes 12A and 12B. It follows that the first movable section 2A is moved toward the glass plate 13. On the other hand, since the voltage H is kept applied to the holding electrode 14B, the second movable section 2B is kept fixed on the side of the glass plate 15.

Figure 1:
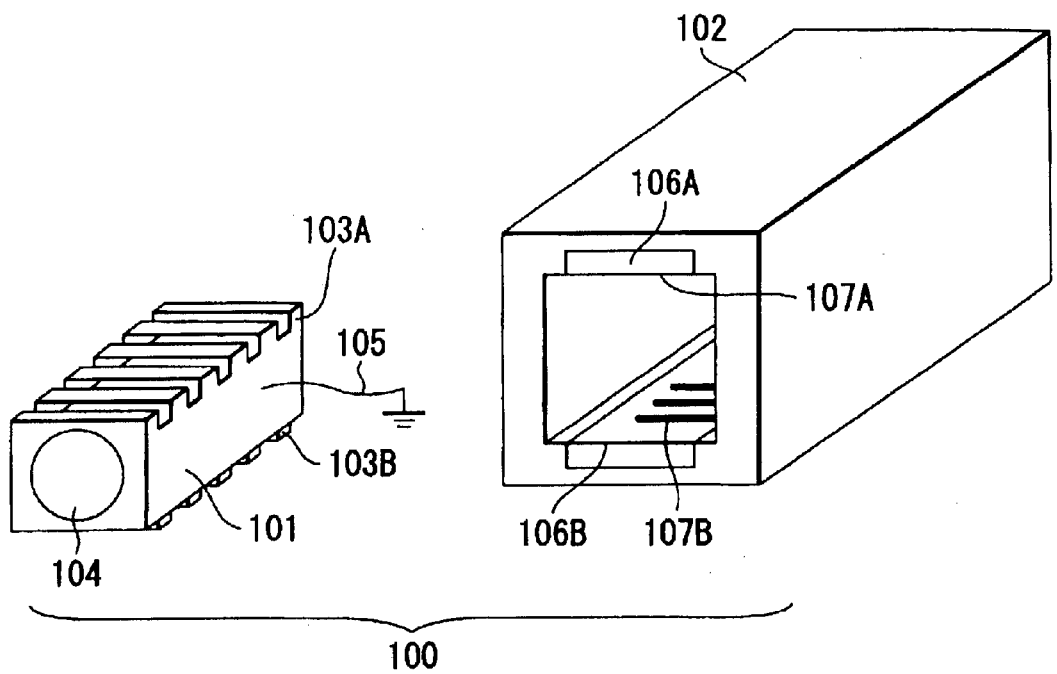
FIG. 1 is an oblique view schematically showing a movable section and a stator included in a conventional electrostatic actuator.
Figure 2:
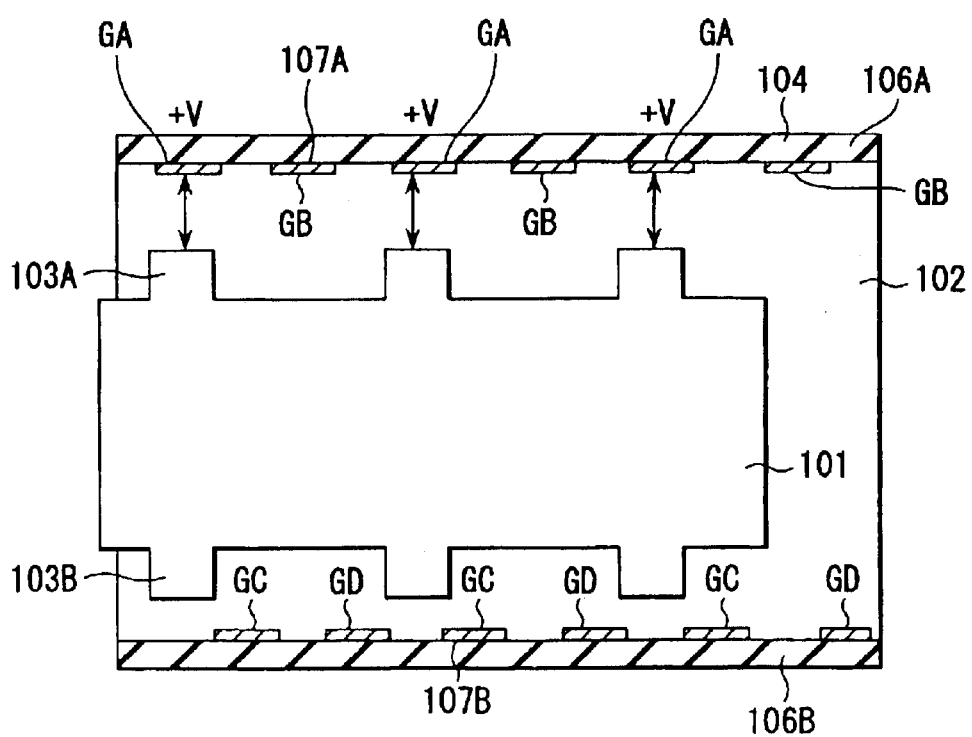
FIG. 2 is a vertical cross sectional view schematically showing the construction inside the conventional electrostatic actuator.

(3) In the next step, a voltage H is applied to the holding electrode 14A at time t2 as shown in FIG. 1E, with the voltage kept applied to the holding electrode 14B. As a result, a strong electrostatic force is generated between the holding electrode 14A and the fixing electrode 5 on the side of the movable section 2A. It follows that the first movable section 2A is moved toward the glass plate 15, and the fixing electrode 5 on the side of the movable section is attracted to the holding electrode 14A.

(4) In the next step, a voltage H is applied to the driving electrodes 12B and 12C at time t3 as shown in FIGS. 11B and 11C, with the voltage kept applied to the holding electrode 14B. As a result, the driving electrode 4 on the side of the movable section 3A in the vicinity of the driving electrodes 12B and 12C is attracted toward the driving electrodes 12B and 12C by an electrostatic force, with the result that the driving electrode 4 on the side of the movable section 2A is attracted to the driving electrodes 12B and 12C. It follows that the first movable section 2A is moved toward the glass plate 13. On the other hand, the second movable section 2B is similarly kept fixed on the side of the glass plate 15. In this case, the first movable section 2A is moved to the right in FIG. 8C by a distance equal to one stripe of the driving electrode section 12, i.e., a distance equal to one pitch, compared with the position described in item (1) above.

(5) In the next step, a voltage H is applied to the holding electrode 14A at time t4 as shown in FIG. 11E, with the voltage kept applied to the holding electrode 14B. As a result, a strong electrostatic force is generated between the holding electrode 14A and the fixing electrode 5 on the side of the movable section. It follows that the first movable section 2A is moved toward the glass plate 15, and the fixing electrode 5 on the side of the movable section 2A is attracted to the holding electrode section 14A.

(6) In the next step, a voltage H is applied to die driving electrodes 12C electrodes 12C and 12D at time t5 as shown in FIGS. 11C and 11D, with the voltage H kept applied to the holding electrode 14B. As a result, the driving electrode 4 on the side of the movable section 2A in the vicinity of the driving electrode strip 2A, 2B is attracted toward the driving electrodes 12C by an electrostatic force, with the result that the driving electrode 4 on the side of the movable section 2A is attracted to the driving electrodes 12C electrodes 12C and 12D. It follows that the first movable section 2A is moved toward the glass plate 13. On the other hand, the second movable section 2B is similarly kept fixed on the side of the glass plate 15. In this case, the first movable section 2A is moved to the right in FIG. 8A by a distance equal to two stripes of the driving electrode section 12, i.e., a distance equal to two pitches, compared with the position described in item (1) above.

(7) In the next step, a voltage H is applied to the holding electrode 14A at time t6 as shown in FIG. 1E, with the voltage H kept applied to the holding electrode 14B. As a result, a strong electrostatic force is generated between the holding electrode 14A and the fixing electrode 5 on the side of the movable section. It follows that the first movable section 2A is moved toward the glass plate 15, and the fixing electrode 5 on the side of the movable section is attracted to the holding electrode section 14A.

(8) In the next step, a voltage H is applied to the driving electrodes 12D and 12A at time t7 as shown in FIGS. 11D and 11A, with the voltage H kept applied to the holding electrode 14W As a result, the driving electrode 4 On the side of the movable section 2A in the vicinity of the driving electrodes 12D and 12A is attracted toward the driving electrodes 12D and 12A by an electrostatic force, with the result that the driving electrode 4 on the side of the movable section is attracted to the driving electrodes 12D and 12A. It follows that the first movable section 2A is moved toward the glass plate 13. On the other hand, the second movable section 2B is similarly kept fixed on the side of the glass plate 15. In this case, the first movable section 2A is moved to the right in FIG. 8A by a distance equal to three stripes of the driving electrode section 12, i.e., distance equal to three pitches, compared with the position described in item (1) above.

(9) In the next step, a voltage H is applied to the holding electrode 14A at time t8 as shown in FIG. 11E, with the voltage H kept applied to the holding electrode 14B. As a result, a strong electrostatic force is generated between the holding electrode section 14A and the fixing electrode 5 on the side of the movable section. It follows that the first movable section 2A is moved toward the glass plate 15, and the fixing electrode 5 on the side of the movable section is attracted to the holding electrode section 14A.

(10) Further, a voltage H is applied to the driving electrodes 12A and 12B at time t9 as shown in FIGS. 11A and 11B, with the voltage kept applied to the holding electrode 14B. As a result, the driving electrode 4 on the side of the movable section in the vicinity of the driving electrodes 12A and 12B is attracted toward the driving electrodes 12A and 12B by an electrostatic force, with the result that the driving electrode 4 on the side of the movable section is attracted to the driving electrodes 12A and 12B. It follows that the first movable section 2A is moved toward the glass plate 13. On the other hand, the second movable section 2B is temporarily kept fixed on the side of the glass plate 15. In this case, the first movable section 2A is moved to the right in FIG. 8C by a distance equal to four stripes of the driving electrode section 12, i.e., a distance equal to four pitches, compared with the position described in item (1) above.

The steps of items (1) to (10) described above are repeated so as to move the first movable section 2A by a desired distance.

Where it is desired to move the first movable section 2A to the right, the steps of operation mode III described above are carried out in the order of items (1), (10), (9), (8), (7). (6), (5), (4), (3) and (2) described above so as to move the first movable section 2A to the left by a desired distance.

The relationship between the positions of the first and second movable sections 2A, 2B and the zooming magnification (magnification of enlargement or reduction) of the lens system will now be described with reference to FIGS. 12A and 12B.

In general, a signal supplied by the user to the input section, e.g., a button or a knob, of an apparatus such as a PDA mounted to the electrostatic actuator is forwarded to a control unit 19 within the apparatus. The control signal for the zooming is formed in the control unit 19 based on the input signal. The first and second movable sections 2A, 2B are driven in accordance with the control signal.

FIG. 12A is a vertical cross sectional view showing an electrostatic actuator, and FIG. 12B is a graph showing the relationship between the positions in the axial direction of the first and second movable sections 2A, 2B and the optical magnification. Curve P in FIG. 12B denotes the moving range of the first movable section 2A, and line Q denotes the moving range of the second movable section 2B. As apparent from FIG. 12B, there is an overlapping region in the moving ranges of the first and second movable sections 2A and 2B in substantially the central portion of the stator 3. Incidentally, in the graph of FIG. 12B, the origin of the abscissa is set at one open portion of the stator 3 of the electrostatic actuator on the side of which the first movable section 2A is mounted.

As shown in FIG. 12A, a CCD sensor 17 is arranged on a fixed plate 18 on the image forming plane of the lenses 6 and 9 in the other open portion of the stator 3 on the side of which the second movable section 2B is mounted, and the fixed plate 18 is fixed to the other open portion of the stator 3.

Also, as shown in FIG. 12B, where the optical system is set at a certain optical magnification X, the first movable section 2A is arranged in a point E and the second movable section 2B is arranged in another point F. Likewise, where the optical system is set at an optical magnification Y larger than the optical magnification X, the first movable section 2A is set at a point G and the second movable section 2B is set at a point H. Further, where the optical system is set at an optical magnification Z larger than the optical magnification Y, the first movable section 2A is set at a point I and the second movable section 2B is set at a point J.

Where the first and second movable sections 2A, 2B are moved to desired positions relative to a desired optical magnification, the first and second movable sections 2A, 2B are roughly moved first, followed by fixing one of the first and second movable sections 2A, 2B and finely moving the other movable section, which is movable, so as to set the position of the movable section, which is movable, at a desired position. Then, the movable section whose position has been set is fixed, and the other movable section is finely moved so as to be set at a desired position (fine operation).

The operations described above are performed by the steps described previously in conjunction with the operation modes I to IV so as to move independently the first and second movable sections 2A and 2B, thereby setting the optical system at a desired magnification.

In the embodiment described above, the first and second movable sections 2A, 2B are roughly moved first, followed by fixing one movable section and finely moving the other movable section so as to be set at a desired position, thereby setting the optical system at a desired optical magnification. Alternatively, it is also possible to move the first and second movable sections 2A, 2B directly to the desired positions by independently controlling the first and second movable sections 2A, 2B without fixing one of the first and second movable sections 2A, 2B in the midway of setting the positions of these first and second movable sections 2A, 2B so as to obtain a desired optical magnification. Where the first movable section 2A is temporarily moved toward the driving electrode section 12 or is temporarily fixed on the side of the driving electrode section 12 in the particular operation, the second movable section 2B is moved toward the holding electrode section 14B or is temporarily fixed to the holding electrode section 14B without fail. In the latter case, however, the time required for the magnification or reduction is rendered somewhat longer than that in the former case.

In the first embodiment described above, a plurality of movable sections for magnifying or reducing the photographed image are independently operated so as to obtain a desired optical magnification.

An electrostatic actuator according to a second embodiment of the present invention will now be described with reference to FIGS. 13A to 13C.

In each of the embodiments described below, the same constituents of the electrostatic actuator are denoted by the same reference numerals so as to avoid an overlapping description.

In the electrostatic actuator according to the second embodiment of the present invention, the holding electrodes 5, 11 on the side of the movable sections are formed in substantially the entire regions of the lower surfaces of the first and second movable sections 2A, 2B.

FIG. 13A is a side view schematically showing the movable sections of the electrostatic actuator according to the second embodiment of the present invention. FIG. 13B is a plan view schematically showing the lower surfaces of the movable sections shown in FIG. 13A. Further, FIG. 13C is a plan view directed to the glass plate of the electrostatic actuator according to the second embodiment of the present invention and schematically showing the upper surface of the glass plate on which the movable sections shown in FIG. 13A are slid.

The fixing electrode 5 on the side of the movable section, which is shaped as shown in FIG. 13B, is mounted to the lower surface of the first movable section 2A shown in FIG. 13A. The fixing electrode 5 on the side of the movable section extends planar on the lower surface of the first movable section 2A and is substantially in the form of a comb having three projecting regions projecting toward the second movable section 2B and two recessed regions sandwiched between the adjacent projecting regions.

As shown in FIG. 13B, the fixing electrode 11 on the side of the movable section is mounted to the lower surface of the second movable section 2B. The fixing electrode 11 on the side of the movable section extends planar on the lower surface of the second movable section 2B and is substantially in the form of a comb having three recessed regions on the side of the first movable section 2A and two projecting regions sandwiched between the adjacent recessed regions. As apparent from FIG. 13B, the holding electrodes 5, 11 on the side of the movable sections are formed complementary such that the recessed regions of one of these holding electrodes 5, 11 are engaged with the projecting regions of the other of these holding electrodes 5, 11.

As shown in FIG. 13C, the holding electrode sections 14A, 14B extend planar such that these holding electrode sections 14B, 14B are electrically separated from each other in the central portion of the glass plate 15 and are shaped in the central portion of the glass plate 15 to conform with the shapes of the holding electrodes 5, 11 on the side of the movable sections, respectively. To be more specific, the holding electrode sections 14A, 14B are shaped complementary in the central portion of the glass plate 15 such that the recessed regions of one of these holding electrode sections 14A, 14B are engaged with the projecting regions of the other of these holding electrode sections 14A, 14B. The electrostatic actuator of the particular construction is operated in a manner similar to that of the electrostatic actuator shown in FIG. 4A. It should be noted, however, that the holding electrode 14A for temporarily fixing the first movable section 2A on the side of the plate 15 is formed to extend to only about the central portion of the glass plate 15. Also, the holding electrode section 14B for temporarily fixing the second movable section 2B on the side of the glass plate 15 is formed in that region of the glass plate 15 in which the holding electrode section 14A is not formed in a manner to extend to only about the central portion of the glass plate 15. It follows that the first movable section 2A is capable of movement from the open portion to only about the central portion of the glass plate 15. Likewise, the second movable section 2B is capable of movement from the CCD sensor 17 to only about the central portion of the glass plate 15.

It should also be noted that, during the period between the time when the movement of the first and second movable sections 2A, 2B is finished and the time when the first and second movable sections 2A, 2B newly begin to be moved, the first movable section 2A continues to be temporarily fixed to any of the driving electrode sections 12 and 14A, and the second movable section 2B continues to be temporarily fixed to any of the driving electrode sections 12 and 14B. Under the fixed state, an electric current is supplied from the internal power source so as to permit the first and second movable sections 2A, 2B to continue to be fixed to the driving electrode sections even if the main power source of the apparatus having the electrostatic actuator mounted thereto is turned off.

As described above, in the electrostatic actuator according to the second embodiment of the present invention, a plurality of movable sections for magnifying or reducing the photographed image are independently operated so as to obtain a desired optical magnification.

It should also be noted that the moving ranges of the first and second movable sections are smaller than those in the first embodiment described previously. However, the possibility of the breakage caused by the mutual contact of the first and second movable sections 2A, 2B can be eliminated in the second embodiment of the present invention so as to improve the reliability of the electrostatic actuator.

An electrostatic actuator according to a third embodiment of the present invention will now be described with reference to FIGS. 14A to 14C.

Figure 14A:
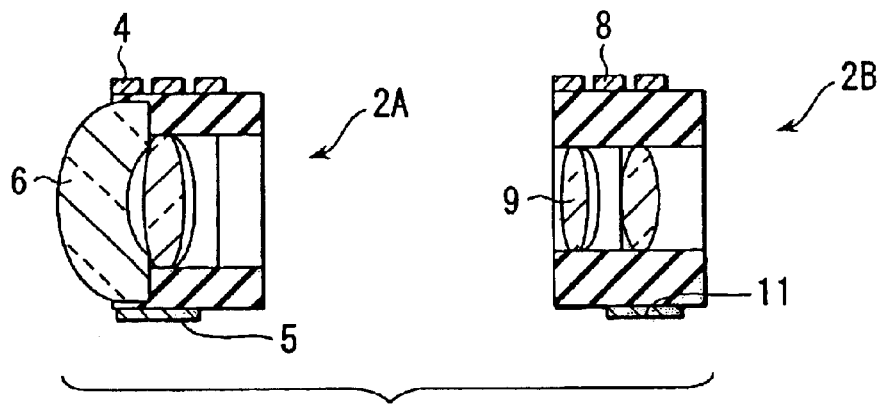
FIG. 14A is a vertical cross sectional view schematically showing the movable section of the electrostatic actuator according to a modification of the second embodiment of the present invention.
Figure 14B:
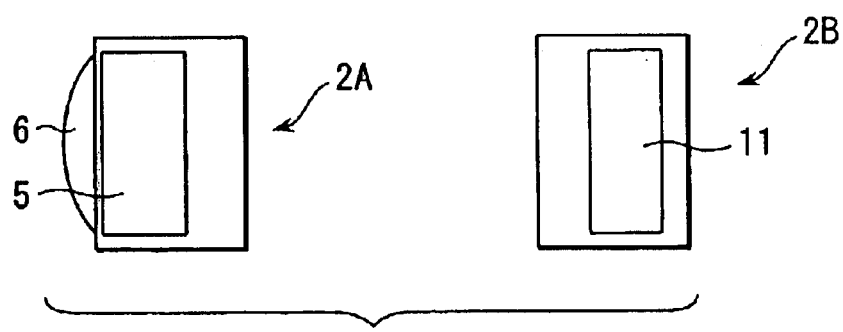
FIG. 14B is a plan view schematically showing the electrode pattern on the lower surface of the movable section shown in FIG. 14A.

In the electrostatic actuator shown in FIG. 14B, each of the holding electrodes 5, 11 on the side of the movable sections is formed in the shape of a flat plate.

FIG. 14A is a side view schematically showing the movable sections in the electrostatic actuator according to the third embodiment of the present invention. FIG. 14B is a plan view schematically showing the lower surfaces of the movable sections shown in FIG. 14A. Further, FIG. 14C is a plan view schematically showing the upper surface of the glass plate included in the electrostatic actuator according to the third embodiment of the present invention.

As shown in the left side portion of FIG. 14B, the fixing electrode 5 on the side of the movable section is formed in the shape of a flat plate. It should be noted, however, that the fixing electrode 5 on the side of the movable section has an area larger than at least half the area of the lower surface of the first movable section 2A and is formed not to extend over the entire region of the lower surface of the first movable section 2A. For example, the fixing electrode 5 on the side of the movable section is arranged away from the movable section 2B in a deviated manner in a predetermined direction.

Figure 14C:
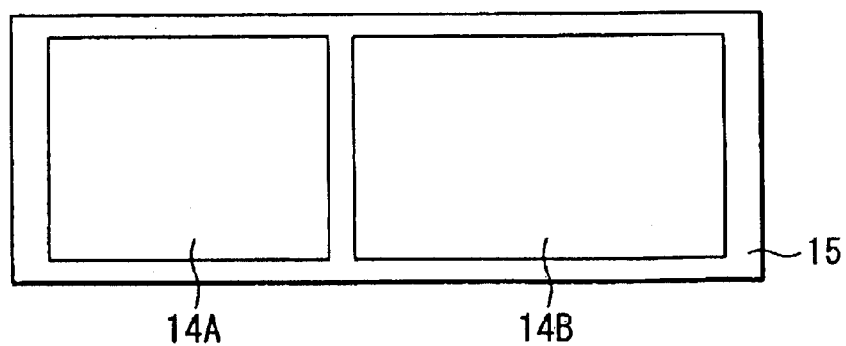
FIG. 14C is a plan view schematically showing the electrode pattern on the glass plate of the stator of an electrostatic actuator having the movable sections shown in FIGS. 14A and 14B incorporated therein.

The fixing electrode 11 on the side of the movable section is formed in the shape of a flat plate in the right portion of FIG. 14C. It should be noted, however, that the fixing electrode 11 on the side of the movable section has an area larger than at least half the area of the lower surface of the second movable section 2B and is formed not to extend over the entire region of the lower surface of the second movable section 2B. For example, the fixing electrode 11 on the side of the movable section is formed away from the first movable section 2A in a deviated manner on the side opposite to the predetermined direction noted above.

Further, the holding electrode sections 14A, 14B are formed to extend planar as shown in FIG. 14C. In other words, the two planar holding electrode sections 14A, 14B are formed apart from each other on the glass plate 15. The areas of the rectangular holding electrode sections 14A, 14B are set in accordance with the moving range (optical magnification) of each of the movable sections. It is possible for these areas to be substantially equal to each other or different from each other. Also, the holding electrode section 14A, for example, is arranged on the glass plate 15 in a deviated manner in a predetermined direction, and the holding electrode section 14B is arranged on the glass plate 15 in a deviated manner on the side opposite to the predetermined directed noted above.

The electrostatic actuator of the construction described above is operated in substantially the same manner as that of the electrostatic actuator according to the first embodiment of the present invention. Also, the first and second movable sections 2A, 2B can be moved only within the ranges in which the holding electrode sections 14A, 14B are formed as in the electrostatic actuator according to the second embodiment of the present invention. It should also be noted that, during the period between the time when the movement of the first and second movable sections 2A, 2B is finished and the time when the first and second movable sections 2A, 2B begin to be newly moved, the first movable section 2A continues to be temporarily fixed to any of the driving electrode sections 12, 14A, and the second movable section 2B continues to be temporarily fixed to any of the driving electrode sections 12, 14B. The fixed state continues to be maintained by the electric current supplied from the internal power source even if the main power source of the apparatus having the electrostatic actuator mounted thereto is turned off.

In the electrostatic actuator of the construction described above, the movable sections for magnifying or reducing the photographed image are moved independently so as to obtain a desired optical magnification.

Also, the moving ranges of the first and second movable sections 2A, 2B are rendered smaller than those in the first embodiment of the present invention. However, the possibility of the breakage caused by the mutual contact of the first and second movable sections 2A, 2B is eliminated so as to improve the reliability of the electrostatic actuator.

It should also be noted that each of the holding electrode sections 14A, 14B is in the shape of a rectangular flat plate. This facilitates the manufacture of the holding electrode sections 14A, 14B so as to contribute to the reduction in the manufacturing cost.

The methods of manufacturing the first and second movable sections 2A, 2B and the stator 3 in each of the first to third embodiments described above will now be described with reference to FIGS. 15A to 19.

The method of manufacturing the stator 3 will be described first with reference to FIGS. 15A to 15C.

Figure 15A:
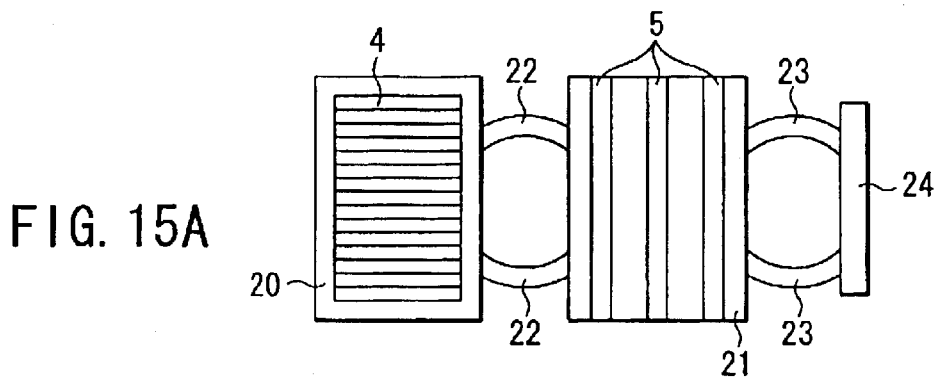
FIG. 15A is plan view schematically showing in a dismantled state the movable section of the electrostatic actuator shown in FIG. 4A.
Figure 15C:
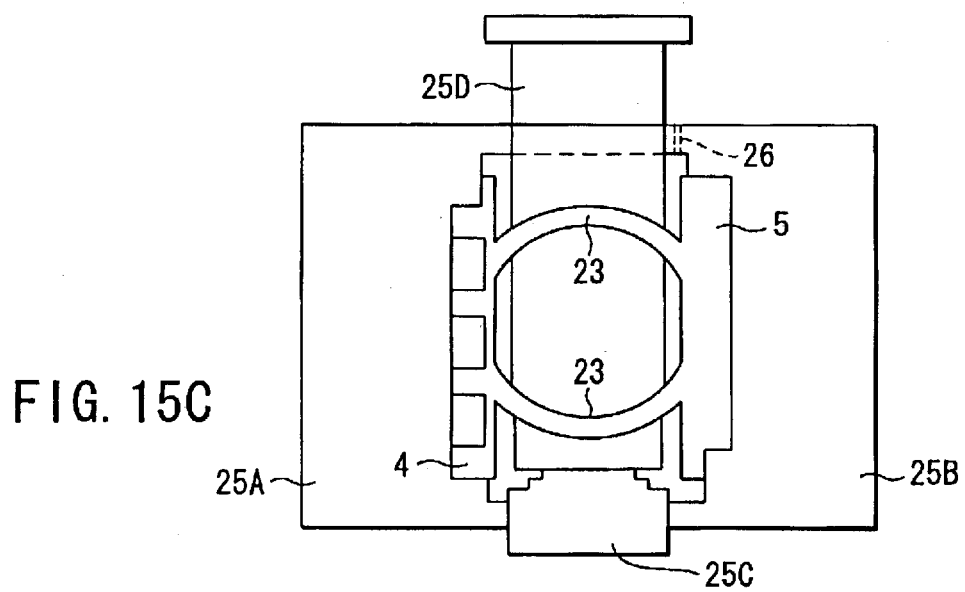
FIG. 15C is a cross sectional view schematically showing the movable section shown in FIG. 15B and a mold having the movable section incorporated therein.

FIG. 15A is a plan view showing in a developed fashion the parts of the movable section. FIG. 15B is an oblique view showing the assembled state of the movable section shown in FIG. 15A. FIG. 15C is a plan view schematically showing the state that the parts of the movable section are mounted to a mold in the process of manufacturing a stator frame. Further, FIG. 15D is an oblique view schematically showing the movable section manufactured through the step shown in FIG. 15C.

As shown in FIG. 15A, the parts of the first movable section 2A comprise a first flat plate 20 having the electrode 4 mounted thereto, a second flat plate 21 having the electrode 5 mounted thereto, an arcuate first connecting member 22 for connecting the first flat plate 20 and the second flat plate 21 to each other, an arcuate second connecting member 23, and an abutting member 24 attached to the first flat plate 20. The driving electrode 4 on the side of the movable section, which has a concave-convex configuration, and the fixing electrode 5 on the side of the movable section is formed by etching on the surfaces of the first flat plate 20 and the second flat plate 21, respectively. The first flat plate 20, the second flat plate 21, the first connecting members 22, 22, the second connecting members 23, 23, and the abutting member 24 are integrally formed by a press molding from a metal plate.

Figure 15B:
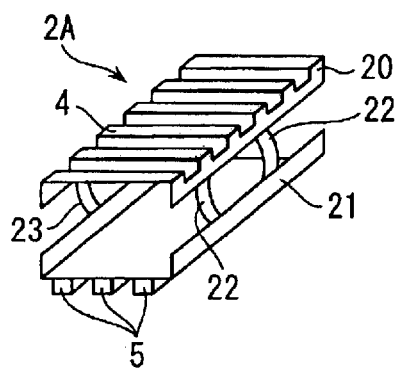
FIG. 15B is an oblique view schematically showing the assembled state of the movable section shown in FIG. 15A.
Figure 15D:
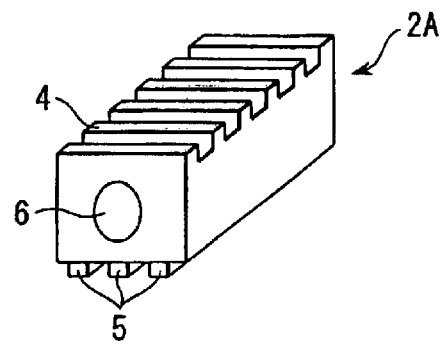
FIG. 15D is an oblique view schematically showing the movable section prepared by using the mold shown in FIG. 15C.

The parts of the first movable section 2A are assembled by the folding as shown in FIG. 15B. Specifically, the connecting portion between the first flat plate 20 and the first connecting members 22, 22, the connecting portion between the second flat plate 21 and the first connecting members 22, 22, the connecting portion between the second flat plate 21 and the second connecting members 23, 23, and the connecting portion between the second connecting members 23, 23 and the abutting member 24 are folded such that the driving electrode 4 on the side of the movable section and the fixing electrode 5 on the side of the movable section are arranged on the outside. After the folding, the abutting member 24 is bonded to the first flat plate 20 by, for example, a spot welding. The first connecting members 22, 22 and the second connecting members 23, 23 are capable of elastically receiving the pressure from the outside, with the result that the movable section is constructed flexible.

In the next step, the parts of the first movable section 2A are fixed by a resin as shown in FIG. 15C.

For fixing the first movable section 2A, used are molds 25A, 25B, 25C and 25D, which can be separated into four parts. The convex portions of the driving electrode 4 on the side of the movable section and the fixing electrode 5 on the side of the movable section are allowed to abut against the inner surfaces of the molds 25A, 25B and, thus, concave recessed spaces are formed on the inner surfaces of the molds 25A, 25B. The mold 25C is fixed in a sandwiched fashion between the molds 25A and 25B. Convex portions in which the lens 6 having a stepped shape is fitted are formed in the outer surfaces of the mold 25C facing the inner walls of the molds 25A, 25B. The mold 25D is also fixed in a sandwiched fashion between the molds 25A and 25B and positioned to face the mold 25C. The mold 25D is arranged to abut against the mold 25C and to be apart from those regions of the first and second flat plates 20, 21 in which the driving electrode 4 on the side of the movable section and the fixing electrode 5 on the side of the movable section are not arranged.

In the first step, the molds 25A and 25B are arranged in contact with the driving electrode 4 on the side of the movable section and the convex portion of the fixing electrode 5 on the side of the movable section of the first movable section 2A. Then, the molds 25C and 25D are inserted into the clearance between the molds 25A and 25B in a manner to close the up-down direction of the first movable section 2A. As a result, the first movable section 2A is covered with the molds 25A to 25D. In this step, the first flat plate 20 and the second flat plate 21 are urged against the molds 25A, 25B by the connecting members 22, 22, 23, 23. The molds 25A to 25D are fixed so as not to be moved.

In the next step, a resin is introduced into the clearance through a resin-introducing hole 26 communicating with a part of the mold 25B. In this step, the molds 25A to 25D are maintained at about 150° C. by a heating means such as a heater, and the resin is poured into the clearance under a state maintained at about 300° C. After the pouring of the resin, the poured resin is gradually cooled with time to about room temperature so as to be solidified. By the solidification of the resin, the first movable section 2A is fixed without being moved by the connecting members 22, 22, 23, 23.

It should be noted that, in this stage, the first and second flat plates 20, 21 are urged by a predetermined elastic force against the molds 25A, 25B, with the result that the first and second flat plates 20, 21 are held apart from each other by a substantially predetermined distance. As a result, the distance between the driving electrode 4 on the side of the movable section and the fixing electrode 5 on the side of the movable section of the first movable section 2A prepared by solidifying the resin is held substantially constant. In addition, the nonuniformity in the manufacturing accuracy can be eliminated so as to obtain a plurality of first movable sections 2A having substantially the same shape.

As shown in FIG. 15D, the lens 6 is mounted to one surface in the axial direction of the first movable section 2A.

Incidentally, the second movable section 2B can also be manufactured by a method similar to the method of manufacturing the first movable section 2A described above.

The resin to be introduced into the clearance is preferably a material having a conductive characteristics into which electrical conductive particles such as carbon particles are mixed to improve an reliability of the wiring on the movable sections 2A and 2B.

The manufacture of the stator frame 3 will now be described with reference to FIGS. 16A to 16C.

Figure 16A:
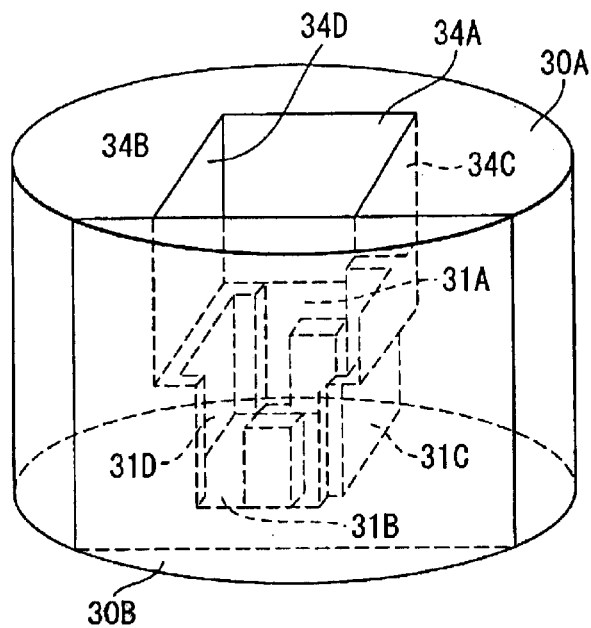
FIG. 16A is an oblique view schematically showing in a partly perspective fashion the mold for manufacturing the stator of the electrostatic actuator shown in FIG. 4A.
Figure 16B:
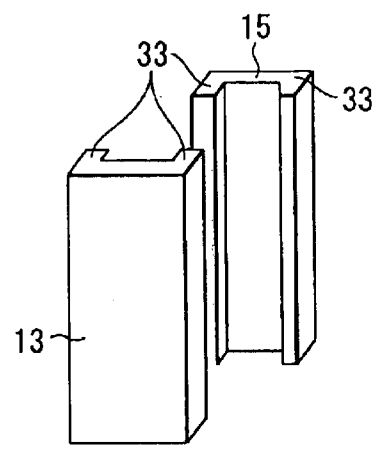
FIG. 16B is an oblique view schematically showing a glass plate used for manufacturing the stator included in the electrostatic actuator shown in FIG. 4A.
Figure 16C:
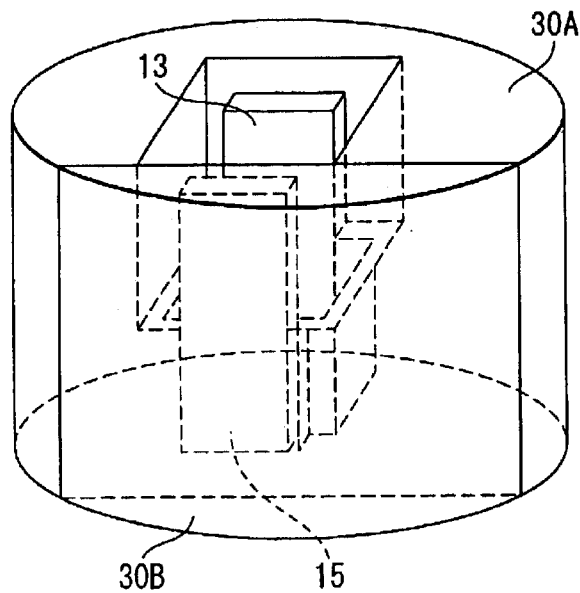
FIG. 16C is an oblique view schematically showing in a partly perspective fashion the assembled structure by mounting a glass plate to the mold of the stator shown in FIG. 16A.

As shown in FIG. 16A, used are two separable molds 30A, 30B. Bores are formed in these molds 30A, 30B such that, when the molds 30A and 30B are combined, the bores are allowed to conform with the outer configuration of the stator frame 3.

At the beginning, the molds 30A and 30B are in a separated state.

The glass plates 13, 15 each having a substantially U-shaped lateral cross section are arranged such that the back surfaces of the glass plates 13, 15 are brought into contact with the convex portions of a pair of mutually facing surfaces 31A, 31B of the molds 30A, 30B, respectively. The patterned driving electrode section 12 and the holding electrode 14 are formed on the surfaces facing the back surfaces of the glass plates 13, 15 and arranged on the surfaces 31A, 31B of the molds 30A, 30B, respectively, in a manner to permit the driving electrode section 12 and the holding electrode section 14 to face each other. It should be noted that the glass plates 13, 15, in which the shapes of these electrodes are simplified, are shown in FIG. 16B.

Figure 16D:
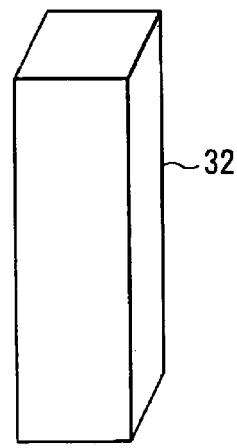
FIG. 16D is an oblique view schematically showing the core mounted to the mold of the stator shown in FIG. 16C.

The molds 30A and 30B are combined such that the side surfaces of a parallelepiped core 32 shown in FIG. 16D are in contact with a surface 31C, not in contact with a surface 31D, and in contact with edges 33 of the driving electrode section 12 and the holding electrode section 14. When the molds 30A and 30B are combined, the concave portions of the driving electrode section 12 and the holding electrode section 14 are not in contact with the concave portions of the core 32, the surface 31D and the surface 31C. Incidentally, the details in the shapes of the molds 30A and 30B are partly omitted in FIG. 16C.

It should also be noted that the core 32 is not in contact with surfaces 34A, 34B, and 34D and is in contact with the convex portion of a surface 34C.

A resin having a conductivity such as a resin is poured into the clearance between the core 32 and the surfaces 34A to 34D. In this stage, the molds 30A, 30B are kept heated to about 150° C. by a heating means such as a heater, and the resin is poured into the clearance in a state held at about 300° C. After the pouring, the resin is gradually cooled with time to about room temperature so as to be solidified.

The core 32 is taken out a predetermined time later (after completion of solidification of the resin), and the molds 30A and 30B are separated from each other so as to obtain the stator 3 of a desired shape.

The electrostatic actuator is prepared by combining the first and second movable sections 2A, 2B, the stator 3 and the glass plates 13, 15 thus manufactured.

Another method of manufacturing the movable section will now be described with reference to FIGS. 17A to 17C.

Figure 17A:
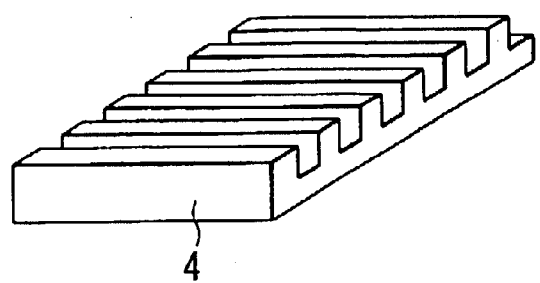
FIG. 17A is an oblique view schematically showing the electrode of the movable section used in the method of manufacturing the electrostatic actuator of the present invention.

As shown in FIG. 17A, the driving electrode 4 on the side of the movable section is obtained by processing a silicon substrate. The concave-convex configuration of the driving electrode 4 on the side of the movable section is formed by an etching such that one surface of the silicon substrate is allowed to bear a concave-convex configuration of a desired size, i.e., on the order of several microns. The etching method is equal to the method employed for increasing the degree of integration of an LSI. It is possible to employ any of the wet etching and the dry etching for forming the concave-convex configuration noted above.

Figure 17B:
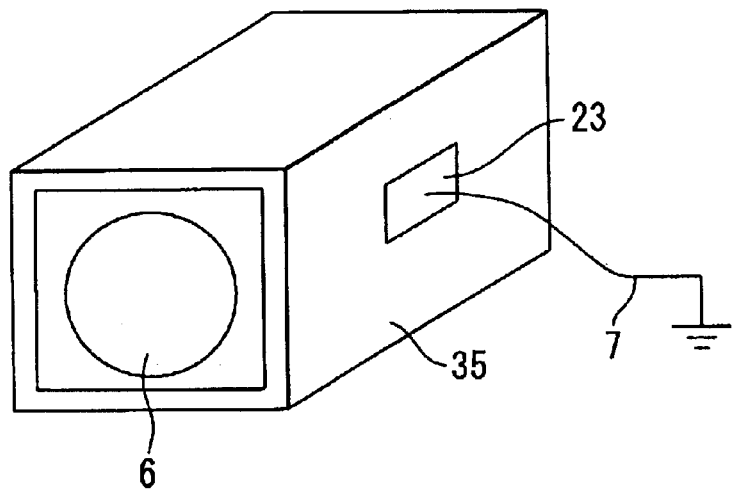
FIG. 17B is an oblique view schematically showing the body of the movable section used in the method of manufacturing the electrostatic actuator of the present invention.

As shown in FIG. 17B, a body 35 of the movable section is prepared by assembling a flat plate formed of a conductive resin into a parallelepiped state. The lens 6 is mounted in the axial direction of the body 35 of the movable section, and a pad 36 to which is connected a ground wiring 7 connected to the ground is formed in a part of the side surface of the body 35 of the movable section.

Figure 17C:
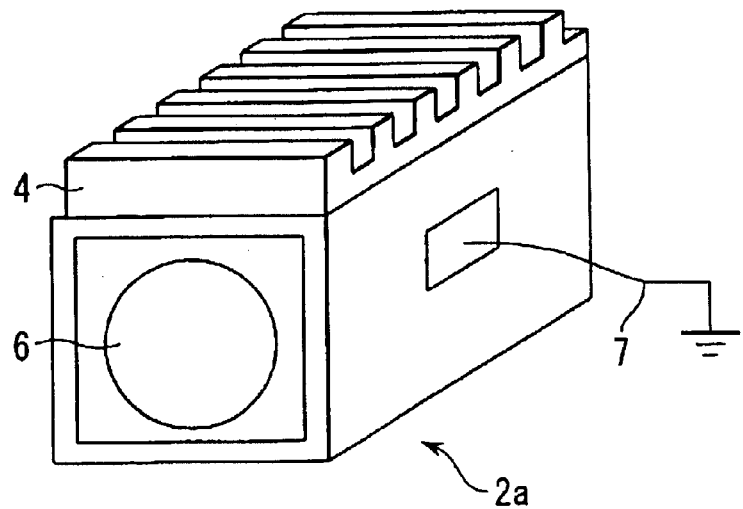
FIG. 17C is an oblique view schematically showing the movable section prepared by fixing the electrode of the movable section shown in FIG. 17A to the body of the movable section shown in FIG. 17B.

As shown in FIG. 17C, the driving electrode 4 on the side of the movable section thus prepared is bonded to the body 35 of the movable section, and the fixing electrode 5 is bonded to the upper surface of the body 35 of the movable section with an acrylic adhesive that is cured upon irradiation with an ultraviolet light so as to prepare the first movable section 2A.

An electrostatic actuator is manufactured by combining the first movable section 2A thus manufactured and the stator 3.

The method of manufacturing the movable section will now be described with reference to FIG. 18.

Figure 18:
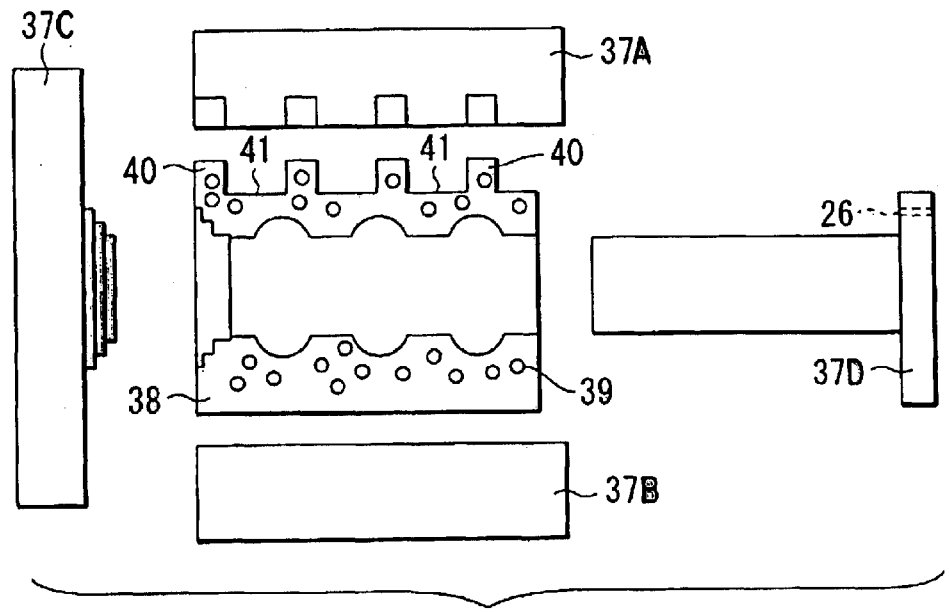
FIG. 18 is a vertical cross sectional view schematically showing the movable section used in the manufacturing method of an electrostatic actuator of the present invention and a mold of the movable section.

FIG. 18 shows the method of manufacturing the movable section. As shown in the drawing, molds 37A to 37D are combined, and a resin is poured into the clearance among the molds 37A to 37D so as to manufacture the first movable section 2A. Incidentally, the mold 37D has a length reaching the mold 37C.

The resin poured into the clearance among the molds 37A to 37D is prepared by mixing carbon particles 38 with carbon fibers 39 each having an electrical conductivity. Incidentally, the carbon particles 38 are substantially in the form of spheres each having a diameter of several microns. On the other hand, the carbon fibers 39 are in the form of rods each having a diameter of about 10 $\mu$m and a length of scores of microns. The first movable section 2A that is not provided with a lens is prepared by solidifying the particular resin.

According to the manufacturing method described above, the convex shapes of the driving electrode 4 on the side of the movable section and the fixing electrode 5 on the side of the movable section of the first movable section 2A are formed at an interval of about 20 $\mu$m. Therefore, it is possible for the carbon fiber 39 not to enter the clearance between adjacent convex portions 40, i.e., not to enter a concave portion 41. However, even if the carbon fiber does not enter the concave portion 41, the carbon particle 38 mixed in the resin enters the concave portion 41. It follows that it is possible to obtain the first movable section 2A having a good conductivity.

The movable sections 2A, 2B may be made of a nonconductive resin. In these movable sections 2A, 2B, an electrical conductivity can be applied to the movable sections with plating a conductive film on the movable sections 2A, 2B after the molding. This method have a disadvantage of increasing manufacturing steps, but according to this manufacturing method, a good conductivity can be applied to the movable sections 2A, 2B.

Another method of manufacturing the movable section and the stator will now be described with reference to FIG. 19.

Figure 19:
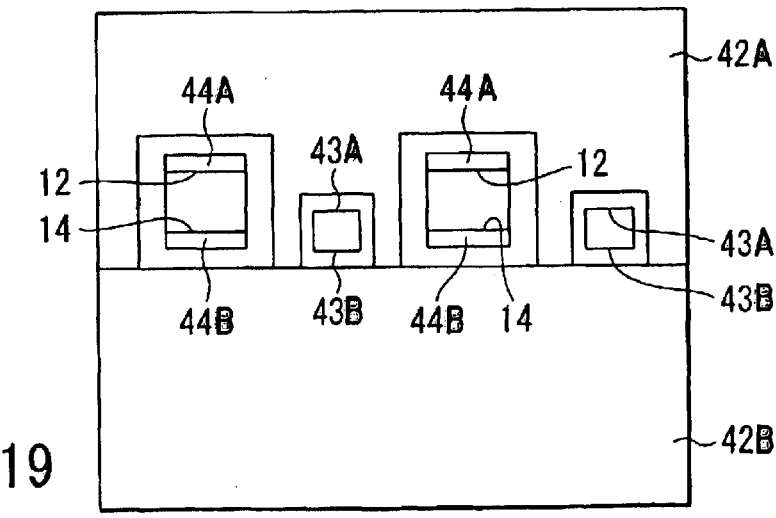
FIG. 19 is a plan view schematically showing a mold of the movable section and the stator used in the manufacturing method of an electrostatic actuator of the present invention.

FIG. 19 shows the manufacturing method of the movable section and the stator. As shown in the drawing, the first and second movable sections 2A, 2B and the stator 3 into which the first and second movable sections 2A, 2B are inserted are formed in a single mold 42A. Incidentally, FIG. 19 shows an example of the mold in which two stators and two movable sections are formed.

The shape of the mold of the first and second movable sections 2A, 2B is substantially equal to that shown in FIG. 18. Also, the shape of the mold of the stator 3 is substantially equal to that shown in FIG. 16A. The shapes of the driving electrode 4 on the side of the movable section and the fixing electrode 5 on the side of the movable section are formed on a pair of mutually facing inner surfaces 43A, 43B of the first movable section 2A. Also, the shapes of the driving electrode 12 and the holding electrode 14 are formed on a pair of mutually facing inner surfaces 44A, 44B of the mold of the stator 3.

By using the molds 42A, 42B of the particular construction, it is possible to manufacture the first and second movable sections 2A, 2B and the stator frame 3 low in the nonuniformity of the dimensional accuracy in a short time on the mass production basis.

Needless to say, the present invention is not limited to each of the embodiments described above and can be worked in variously modified fashions within the technical scope of the present invention. For example, it is possible to detect the positions of the two movable sections by an optical sensor and, if these two movable sections are likely to collide against each other, it is possible to fix temporarily one of these movable sections so as to avoid the collision.

Also, it is not absolutely necessary for two movable sections to be inserted into the stator. It is possible for three or more movable sections to be inserted into the stator in order to obtain a desired magnification.

Further, the shapes of the first bonding member and the second bonding member are not particularly limited as far as these bonding members are shaped to produce elastic characteristics.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of driving an electrostatic actuator, the electrostatic actuator comprising:

first stator electrodes arranged in a predetermined direction and extending in a direction crossing the predetermined direction;
a second stator electrode arranged to face the first stator electrodes and extending in the predetermined direction;
a third stator electrode arranged to face the first stator electrodes and extending in the predetermined direction so as to be electrically isolated from the second stator electrode;
a first movable section provided with first movable section electrodes and a second movable section electrode, the first movable section being configured to be movable within a moving space in the predetermined direction, the moving space being defined between the first stator electrodes and the second stator electrode, the first movable section electrodes being mounted to the first movable section to face the first stator electrodes and the second movable section electrode being mounted to the first movable section to face the second stator electrode; and
a second movable section provided with third movable section electrodes and a fourth movable section electrode, the second movable section being configured to be movable within the moving space in the predetermined direction independently of the first movable section, the third movable section electrodes being mounted to the second movable section to face the first stator electrodes and the fourth movable section electrode being mounted to the second movable section to face the third stator electrode, the method comprising:
supplying first and second driving signals to the first and the second stator electrodes, respectively, to move the first movable section in the space in the predetermined direction, and
supplying a holding signal to the third stator electrode to hold the second movable section.

2. The method according to claim 1, wherein the first stator electrodes, the first movable section electrodes, and the third movable section electrodes are arranged substantially in parallel.

3. The method according to claim 2, wherein the first movable section electrodes and the third movable section electrodes have substantially a same arranging pitch and width.

4. The method according to claim 2, wherein the first stator electrodes have an arranging pitch substantially equal to one-fourth of the arranging pitch of the first movable section electrodes and the third movable section electrodes.

5. The method according to claim 1, wherein the first movable section is moved in the moving space in the predetermined direction with the fourth movable section electrode being attracted to the third stator electrode so as to hold the second movable section.

6. A method of driving an electrostatic actuator, the electrostatic actuator comprising:

first stator electrodes arranged in a predetermined direction and extending in a direction crossing the predetermined direction;
a second stator electrode arranged to face the first stator electrodes and extending in the predetermined direction;
a third stator electrode arranged to face the first stator electrodes and extending in the predetermined direction so as to be electrically isolated from the second stator electrode;
a first movable section provided with first and second movable section electrodes and a second movable section electrode, the first movable section being configured to be movable within a moving space in the predetermined direction, the moving space being defined between the first stator electrodes and the second stator electrode, the first movable section electrodes being mounted to the first movable section to face the first stator electrodes and the second movable section electrode being mounted to the first movable section to face the second stator electrode; and a second movable section provided with third movable section electrodes and a fourth movable section electrode, the second movable section being configured to be movable within the moving space in the predetermined direction independently of the first movable section, the third movable section electrodes being mounted to the second movable section to face the first stator electrodes and the fourth movable section electrode being mounted to the second movable section to face the third stator electrode, the method comprising:

supplying first and second driving signals to the first and second stator electrodes, respectively, to move the second movable section in the predetermined direction, and supplying a holding voltage signal to the second stator electrode to hold the first movable section.

7. The method according to claim 6, wherein the first stator electrodes, the first movable section electrodes, and the third movable section electrodes are arranged substantially in parallel.

8. The method according to claim 7, wherein the first movable section electrodes and the third movable section electrodes have substantially a same arranging pitch and width.

9. The method according to claim 7, wherein the first stator electrodes have an arranging pitch substantially equal to one-fourth of the arranging pitch of the first movable section electrodes and the third movable section electrodes.

10. The method according to claim 6, wherein the second movable section is moved in the moving space in the predetermined direction with the second movable section electrode being attracted to the second stator electrode so as to hold the first movable section.

11. A method of driving an electrostatic actuator, the electrostatic actuator comprising:

first stator electrodes arranged in a predetermined direction and extending in a direction crossing the predetermined direction;

a second stator electrode arranged to face the first stator electrodes and extending in the predetermined direction;

a third stator electrode arranged to face the first stator electrodes and extending in the predetermined direction so as to be electrically isolated from the second stator electrode;

a first movable section provided with first movable section electrodes and a second movable section electrode, the first movable section being configured to be movable within a moving space in the predetermined direction, the moving space being defined between the first stator electrodes and the second stator electrode, the first movable section electrodes being mounted to the first movable section to face the first stator electrodes and the second movable section electrode being mounted to the first movable section to face the second stator electrode; and a second movable section provided with third movable section electrodes and a fourth movable section electrode, the second movable section being configured to be movable within the moving space in the predetermined direction independently of the first movable section, the third movable section electrodes being mounted to the second movable section to face the first stator electrodes and the fourth movable section electrode being mounted to the second movable section to face the third stator electrode, the method comprising:

supplying first and second driving signals to the first and second stator electrodes, respectively, to move the first and second movable sections simultaneously in the predetermined direction.

12. The method according to claim 11, wherein the first stator electrodes, the first movable section electrodes, and the third movable section electrodes are arranged substantially in parallel.

13. The method according to claim 12, wherein the first movable section electrodes and the third movable section electrodes have substantially a same arranging pitch and width.

14. The method according to claim 12, wherein the first stator electrodes have an arranging pitch substantially equal to one-fourth of the arranging pitch of the first movable section electrodes and the third movable section electrodes.

15. A method of driving an electrostatic actuator, the electrostatic actuator comprising:

a stator including a hollow stator frame having a space extending in a predetermined direction, the hollow stator frame having a first inner surface extending in parallel to the predetermined direction and a second inner surface, wherein first stator electrodes are arranged in the predetermined direction on the first inner surface and each of the first stator electrodes extend in a direction crossing the predetermined direction and second and third stator electrodes that are electrically isolated from each other are arranged on the second inner surface so as to extend in the predetermined direction;

a first movable section arranged in the space to be movable in the space in the predetermined direction, the first movable section including first movable section electrodes facing the first stator electrodes, each of the first movable section electrodes extending in the direction crossing the predetermined direction and a second movable section electrode extending in the predetermined direction to face the second stator electrode;

a second movable section arranged in the space to be movable in the space in the predetermined direction, the second movable section including third movable section electrodes facing the first stator electrodes, each of the third movable section electrodes extending in the direction crossing the predetermined direction and a fourth movable section electrode extending in the predetermined direction to face the third stator electrode, the method comprising:

supplying first and second driving signals to the first and the second stator electrodes, respectively, to move the first movable section in the space in the predetermined direction, and supplying a holding signal to the third stator electrode to hold the second movable section.

16. The method according to claim 15, wherein the first movable section is moved in the space in the predetermined direction with the fourth movable section electrode being attracted to the third stator electrode so as to hold the second movable section.

17. The method according to claim 15, wherein the second and third stator electrodes extend substantially in parallel in the predetermined direction and the second and fourth movable section electrodes also extend substantially in parallel in the predetermined direction.

18. The method according to claim 15, wherein the second and third stator electrodes are planar electrodes extending in the predetermined direction and arranged separately from each other in the predetermined direction and the first and second movable sections are moved within the range in which the second and third stator electrodes are extended in the predetermined direction.

19. A method of driving an electrostatic actuator, the electrostatic actuator comprising:

a stator including a hollow stator frame having a space extending in a predetermined direction, the hollow stator frame having a first inner surface extending in parallel to the predetermined direction and a second inner surface, first stator electrodes are arranged in the predetermined direction on the first inner surface and each of the first stator electrodes extend in a direction crossing the predetermined direction and second and third stator electrodes electrically isolated from each other are arranged on the second inner surface so as to extend in the predetermined direction;

a first movable section arranged in the space to be movable in the space in the predetermined direction, the first movable section including first movable section electrodes facing the first stator electrodes, each of the first movable section electrodes extending in the direction crossing the predetermined direction and a second movable section electrode extending in the predetermined direction to face the second stator electrode;

a second movable section arranged in the space to be movable in the space in the predetermined direction, the second movable section including third movable section electrodes facing the first stator electrodes, each of the third movable section electrodes extending in the direction crossing the predetermined direction and a fourth movable section electrode extending in the predetermined direction to face the third stator electrode, the method comprising:

supplying first and second driving signals to the first and the second stator electrodes, respectively, to move the second movable section in the space in the predetermined direction, and supplying a holding signal to the second stator electrode to hold the first movable section.

20. The method according to claim 19, wherein the second movable section is moved in the space in the predetermined direction with the second movable section electrode being attracted to the second stator electrode so as to hold the first movable section.

21. The method according to claim 19, wherein the second and third stator electrodes extend substantially in parallel in the predetermined direction and the second and fourth movable section electrodes also extend substantially in parallel in the predetermined direction.

22. The method according to claim 21, wherein the second and third stator electrodes are planar electrodes extending in the predetermined direction and arranged separately from each other in the predetermined direction and the first and second movable sections are moved within the range in which the second and third stator electrodes are extended in the predetermined direction.

23. A method of driving an electrostatic actuator, the electrostatic actuator comprising:

a stator including a hollow stator frame having a space extending in a predetermined direction, the hollow stator frame having a first inner surface extending in parallel to the predetermined direction and a second inner surface, first stator electrodes are arranged in the predetermined direction on the first inner surface and each of the first stator electrodes extend in a direction crossing the predetermined direction and second and third stator electrodes electrically isolated from each other are arranged on the second inner surface so as to extend in the predetermined direction;

a first movable section arranged in the space to be movable in the space in the predetermined direction, the first movable section including first movable section electrodes facing the first stator electrodes, each of the first movable section electrodes extending in the direction crossing the predetermined direction and a second movable section electrode extending in the predetermined direction to face the second stator electrode, a second movable section arranged in the space to be movable in the space in the predetermined direction, the second movable section including third movable section electrodes facing the first stator electrodes, each of the third movable section electrodes extending in the direction crossing the predetermined direction and a fourth movable section electrode extending in the predetermined direction to face the third stator electrode, the method comprising:

supplying first and second driving signals to the first and the second stator electrodes, respectively, to move the first and the second movable section simultaneously in the moving space in the predetermined direction.

24. The method according to claim 23, wherein the second and third stator electrodes extend substantially in parallel in the predetermined direction and the second and fourth movable section electrodes also extend substantially in parallel in the predetermined direction.

25. The method according to claim 23, wherein the second and third stator electrodes are planar electrodes extending in the predetermined direction and arranged separately from each other in the predetermined direction and the first and second movable sections are moved within the range in which the second and third stator electrodes are extended in the predetermined direction.

* * * * *